(12) United States Patent
Choi et al.

(10) Patent No.: US 11,892,925 B2
(45) Date of Patent: Feb. 6, 2024

(54) ELECTRONIC DEVICE FOR RECONSTRUCTING AN ARTIFICIAL INTELLIGENCE MODEL AND A CONTROL METHOD THEREOF

(71) Applicant: SAMSUNG ELECTRONICS CO., LTD., Suwon-si (KR)

(72) Inventors: Inkwon Choi, Suwon-si (KR); Jaedeok Kim, Suwon-si (KR); Chiyoun Park, Suwon-si (KR); Youngchul Sohn, Suwon-si (KR); Changhyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 587 days.

(21) Appl. No.: 16/655,951

(22) Filed: Oct. 17, 2019

(65) Prior Publication Data

US 2020/0125893 A1 Apr. 23, 2020

(30) Foreign Application Priority Data

Oct. 19, 2018 (KR) ........................ 10-2018-0125029

(51) Int. Cl.
*G06F 11/30* (2006.01)
*G06N 20/00* (2019.01)
(Continued)

(52) U.S. Cl.
CPC ...... *G06F 11/3003* (2013.01); *G06F 11/3058* (2013.01); *G06F 11/3438* (2013.01);
(Continued)

(58) Field of Classification Search
CPC .............. G06K 9/6253; G06F 11/3058; G06F 11/3438; G06F 11/3003; G06F 11/3089;
(Continued)

(56) References Cited

U.S. PATENT DOCUMENTS 7,266,532 B2    9/2007   Sutton et al.
7,752,152 B2*   7/2010   Paek ....................... G10L 15/22
                                                           706/20
(Continued)

FOREIGN PATENT DOCUMENTS

JP    2014-50037 A      3/2014
JP    2017-182319 A    10/2017
(Continued)

OTHER PUBLICATIONS

International Search Report (PCT/ISA/210) dated Jan. 28, 2020 issued by the International Searching Authority in International Application No. PCT/KR2019/013608.
(Continued)

*Primary Examiner* — Matthew J Brophy
(74) *Attorney, Agent, or Firm* — Sughrue Mion, PLLC

(57) ABSTRACT

An electronic device for reconstructing an artificial intelligence model, and a control method thereof are provided. The control method includes inputting at least one input data to a first artificial intelligence (AI) model, to acquire at least one output data, acquiring first usage information, based on the acquired at least one output data, acquiring first reconstruction information for reconstructing the first AI model, based on the acquired first usage information, and reconstructing the first AI model, based on the acquired first reconstruction information, to acquire a second AI model.

19 Claims, 21 Drawing Sheets

(51) Int. Cl.
  *G06F 11/34* (2006.01)
  *G06F 18/40* (2023.01)
  *G06V 10/82* (2022.01)
  *G06V 10/94* (2022.01)
(52) U.S. Cl.
  CPC ............. *G06F 18/40* (2023.01); *G06N 20/00* (2019.01); *G06V 10/82* (2022.01); *G06V 10/945* (2022.01)
(58) Field of Classification Search
  CPC . G06F 11/3409; G06F 11/3447; G06N 20/00; G06N 3/0454; G06N 3/08; G06V 10/82
  See application file for complete search history.

(56) References Cited

U.S. PATENT DOCUMENTS

| | | | |
|---|---|---|---|
| 8,694,451 B2 | 4/2014 | Sasagawa | |
| 9,009,025 B1* | 4/2015 | Porter | G10L 15/197 704/251 |
| 9,324,321 B2* | 4/2016 | Xue | G06N 3/082 |
| 10,664,766 B2* | 5/2020 | Hammond | G06F 9/451 |
| 11,100,423 B2* | 8/2021 | Hammond | G06N 5/04 |
| 2014/0067742 A1 | 3/2014 | Katayama et al. | |
| 2014/0129226 A1* | 5/2014 | Lee | G06F 21/6245 704/E15.005 |
| 2014/0337007 A1* | 11/2014 | Waibel | G06F 40/58 704/2 |
| 2015/0242760 A1* | 8/2015 | Miao | G06N 20/00 706/12 |
| 2015/0324686 A1* | 11/2015 | Julian | G06N 3/08 706/25 |
| 2016/0019887 A1* | 1/2016 | Kim | G10L 15/183 704/246 |
| 2017/0124484 A1* | 5/2017 | Thompson | G06F 3/0484 |
| 2017/0213128 A1* | 7/2017 | Hammond | G06N 3/008 |
| 2017/0213131 A1* | 7/2017 | Hammond | G06N 3/045 |
| 2017/0251081 A1 | 8/2017 | Roychowdhury et al. | |
| 2018/0182386 A1* | 6/2018 | Lee | G10L 15/22 |
| 2019/0236486 A1* | 8/2019 | Azab | G06N 20/00 |

FOREIGN PATENT DOCUMENTS

| | | |
|---|---|---|
| WO | 2017/132590 A1 | 8/2017 |
| WO | 2017/216976 A1 | 12/2017 |

OTHER PUBLICATIONS

Written Opinion (PCT/ISA/237) dated Jan. 28, 2020 issued by the International Searching Authority in International Application No. PCT/KR2019/013608.
Communication dated Jun. 7, 2021 issued by the European Intellectual Property Office in counterpart European Application No. 19873262.0.
Examination Report dated Feb. 13, 2023, issued by European Patent Office for European Patent Application No. 19873262.0.
Communication dated Nov. 2, 2023, issued by the European Patent Office in counterpart European Application No. 19873262.0.

\* cited by examiner

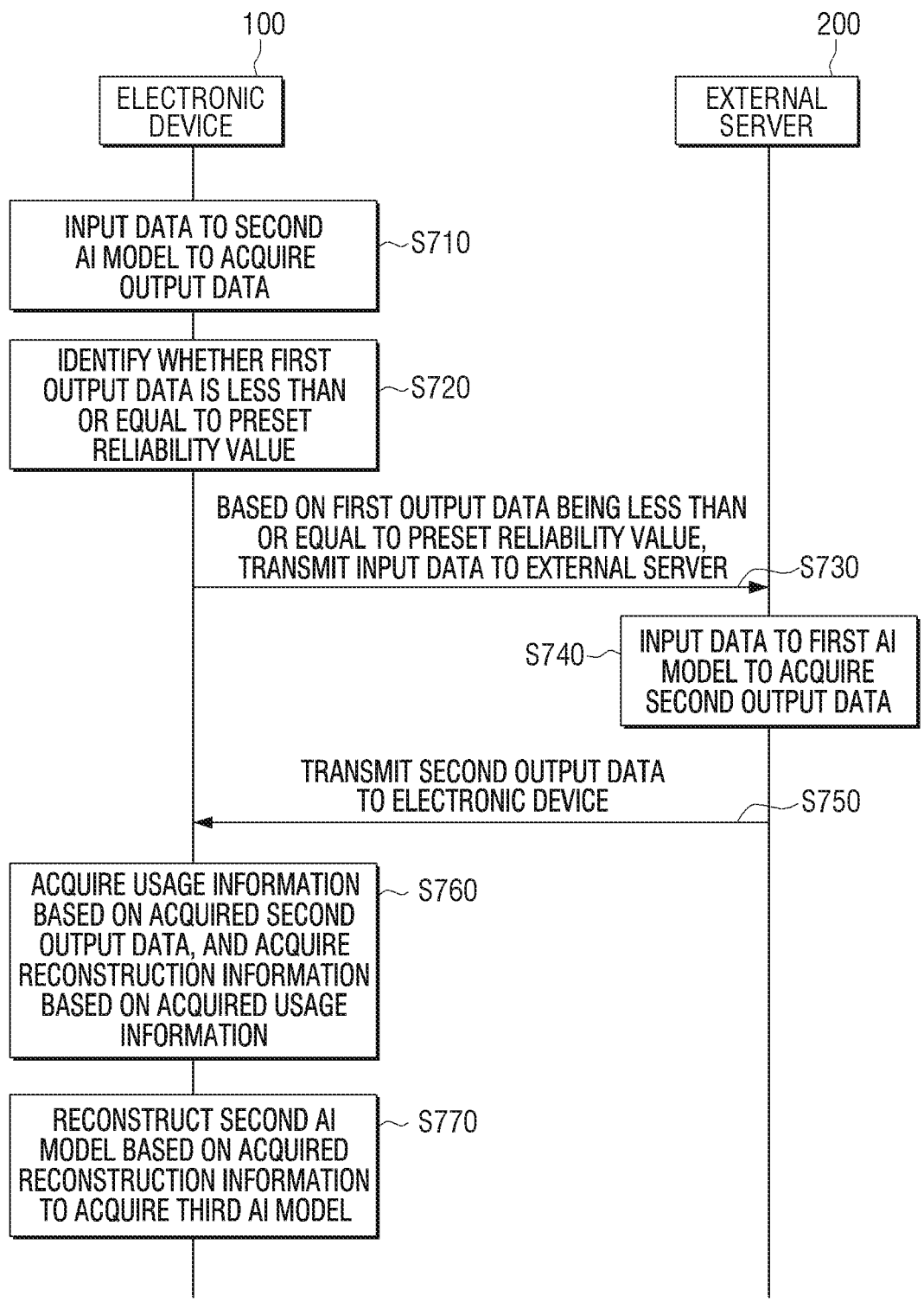

FIG. 10B

| SET USAGE INFORMATION | |
|---|---|
| PHARMACY | > |
| HOSPITAL | > |
| BUSINESS | > |
| TRAVEL | > |
| EXERCISE | > |
| INPUT MANUALLY | > |

ELECTRONIC DEVICE FOR RECONSTRUCTING AN ARTIFICIAL INTELLIGENCE MODEL AND A CONTROL METHOD THEREOF

CROSS-REFERENCE TO RELATED APPLICATION

This application is based on and claims priority under 35 U.S.C. § 119 to Korean Patent Application No. 10-2018-0125029, filed on Oct. 19, 2018, in the Korean Intellectual Property Office, the disclosure of which is incorporated by reference herein in its entirety.

BACKGROUND

1. Field

The disclosure relates to an artificial intelligence (AI) system simulating functions such as recognition, determination and the like of a human brain by utilizing a machine learning algorithm, and an application thereof. More particularly, the disclosure relates to an electronic device for reconstructing an artificial intelligence model and a control method thereof.

2. Description of Related Art

An artificial intelligence (AI) system is a computer system implementing intelligence of a human level, and is a system in which a machine learns, determines and becomes smart on its own unlike previous rule-based smart systems. As the use of artificial intelligence system increases the recognition rate and understanding of user preferences more accurately, previous rule-based smart systems are gradually being replaced by deep learning-based artificial intelligence systems.

The AI technology includes machine learning (deep learning) and element technologies using the machine learning.

The machine learning is an algorithm technology that classifies and learns features of input data on its own. The element technology is a technology that utilizes a machine learning algorithm such as deep learning and the like, which may include various technical fields such as linguistic understanding, visual understanding, inference/prediction, knowledge expression, motion control and the like.

Various fields in which the AI technology is applied are shown below. The linguistic understanding is a technique to recognize human languages and characters and apply and process them, which may include natural language processing, machine translation, conversation system, question and answer, voice recognition and synthesis, etc. The visual understanding is a technique to recognize an object as if the object were viewed from a human sight, which may include object recognition, object tracking, image search, human recognition, scene understanding, space understanding, image improvement and the like. The inference/prediction is a technique to identify information, and logically infer and predict the identified information, which may include inference based on knowledge and probability, optimization prediction, preference-based plan, recommendation, etc. The knowledge expression is a technique to automate experience information of human to knowledge data, which may include knowledge construction (data acquisition and classification), knowledge management (data utilization), etc. The motion control is a technique to control an autonomous driving of a vehicle and a motion of a robot, which may include motion control (navigation, collision and driving), manipulation control (behavioral control), etc.

A related-art AI technology uses a lot of learning time and a large storage space. Accordingly, the related-art AI technology is often performed in an external server with a large storage space and capable of performing high computation, and methods to effectively use an AI model in a user terminal device such as a smartphone are being discussed.

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, a control method of an electronic device, includes inputting at least one input data to a first artificial intelligence (AI) model, to acquire at least one output data, acquiring first usage information, based on the acquired at least one output data, acquiring first reconstruction information for reconstructing the first AI model, based on the acquired first usage information, and reconstructing the first AI model, based on the acquired first reconstruction information, to acquire a second AI model.

The first usage information may include any one or any combination of information related to a usage pattern of a user, information related to a place where the electronic device is located, information of an age of a user of the electronic device, context information and environment information.

The first reconstruction information may include any one or any combination of information regarding a structure of the second AI model, information regarding a weight of the second AI model, and delta information for reconstructing the first AI model, and the delta information may include either one or both of structure information of the first AI model and/or the second AI model, and information regarding a difference of weights between the first AI model and the second AI model.

The control method may further include inputting a first input data to the acquired second AI model, to acquire a first output data, based on a reliability of the acquired first output data being less than or equal to a predetermined value, transmitting the first input data to a server, and acquiring, from the server, a second output data with respect to the transmitted first input data.

The control method may further include acquiring second usage information, based on the acquired second output data, acquiring second reconstruction information for reconstructing the second AI model, based on the acquired second usage information, and reconstructing the acquired second AI model, based on the acquired second reconstruction information, to acquire a third AI model.

The control method may further include, based on any one of the acquired at least one output data being output a number of times less than a predetermined value, acquiring, based on the acquired at least one output data, second usage information excluding the any one of the at least one output data, acquiring second reconstruction information for reconstructing the second AI model, based on the acquired second usage information, and reconstructing the acquired second AI model, based on the acquired second reconstruction information to acquire a third AI model.

The control method may further include displaying a user interface (UI) for adding to and/or changing the acquired first usage information, based on a user command for adding to and/or changing the acquired first usage information being input through the displayed UI, modifying the acquired first usage information, acquiring second reconstruction information for reconstructing the second AI model, based on the modified first usage information, and reconstructing the acquired second AI model, based on the acquired second reconstruction information, to acquire a third AI model.

Each of the first AI model and the second AI model may be for image analysis or for voice processing and language understanding.

In accordance with an aspect of the disclosure, an electronic device including a memory storing instructions, and a processor configured to execute the stored instructions to input at least one input data to a first artificial intelligence (AI) model, to acquire at least one output data, acquire first usage information, based on the acquired at least one output data, acquire first reconstruction information for reconstructing the first AI model, based on the acquired first usage information, and reconstruct the first AI model, based on the acquired first reconstruction information, to acquire a second AI model.

The first usage information may include any one or any combination of information related to a usage pattern of a user, information related to a place where the electronic device is located, information of an age of a user of the electronic device, context information and environment information.

The first reconstruction information may include any one or any combination of information regarding a structure of the second AI model, information regarding a weight of the second AI model, and delta information for reconstructing the first AI model, and the delta information may include either one or both of structure information of the first AI model and/or the second AI model, and information regarding a difference of weights between the first AI model and the second AI model.

The electronic device may further include a communicator including a circuitry, and the processor may be further configured to execute the stored instructions to input a first input data to the acquired second AI model, to acquire a first output data, based on a reliability of the acquired first output data being less than or equal to a predetermined value, control the communicator to transmit the first input data to a server via the communicator, and acquire, from the server via the communicator, a second output data with respect to the transmitted first input data.

The processor may be further configured to execute the stored instructions to acquire second usage information, based on the acquired second output data, acquire second reconstruction information for reconstructing the second AI model, based on the acquired second usage information, and reconstruct the acquired second AI model, based on the acquired second reconstruction information, to acquire a third AI model.

The processor may be further configured to execute the stored instructions to, based on any one of the acquired at least one output data being output a number of times less than a predetermined value, acquire, based on the acquired at least one output data, second usage information excluding the any one of the at least one output data, acquire second reconstruction information for reconstructing the second AI model, based on the acquired second usage information, and reconstruct the acquired second AI model, based on the acquired second reconstruction information to acquire a third AI model.

The electronic device may further include a display, and the processor may be further configured to execute the stored instructions to control the display to display a user interface (UI) for adding to and/or changing the acquired first usage information, based on a user command for adding to and/or changing the acquired first usage information being input through the displayed UI, modify the acquired first usage information, acquire second reconstruction information for reconstructing the second AI model, based on the modified first usage information, and reconstruct the acquired second AI model, based on the acquired second reconstruction information to acquire a third AI model.

Each of the first AI model and the second AI model may be for image analysis or for voice processing and language understanding.

In accordance with an aspect of the disclosure, a control method of a system that includes an electronic device for reconstructing an artificial intelligence (AI) model, and a server, includes inputting, by the electronic device, at least one input data to a first AI model, to acquire at least one output data, acquiring, by the electronic device, first usage information, based on the acquired at least one output data, and transmitting, by the electronic device, the acquired first usage information to the server. The control method further includes acquiring, by the server, first reconstruction information for reconstructing the first AI model, based on the transmitted first usage information, transmitting, by the server, the acquired first reconstruction information to the electronic device, and reconstructing, by the electronic device, the first AI model, based on the transmitted first reconstruction information, to acquire a second AI model.

The first usage information may include any one or any combination of information related to a usage pattern of a user, information related to a place where the electronic device is located, information of an age of a user of the electronic device, context information and environment information. The first reconstruction information may include any one or any combination of information regarding a structure of the second AI model, information regarding a weight of the second AI model, and delta information for reconstructing the first AI model. The delta information may include either one or both of structure information of the first AI model and/or the second AI model, and information regarding a difference of weights between the first AI model and the second AI model.

The control method may further include, based on any one of the acquired at least one output data being output a number of times less than a predetermined value, acquiring, by the electronic device, based on the acquired at least one output data, second usage information excluding the any one of the at least one output data, transmitting, by the electronic device, the acquired second usage information to the server, acquiring, by the server, second reconstruction information for reconstructing the second AI model, based on the transmitted second usage information, transmitting, by the server, the acquired second reconstruction information to the electronic device, and reconstructing, by the electronic device, the acquired second AI model, based on the transmitted second reconstruction information, to acquire a third AI model.

The control method may further include displaying, by the electronic device, a user interface (UI) for adding to and/or changing the acquired first usage information, based on a user command for adding to and/or changing the acquired first usage information being input through the displayed UI, modifying the acquired first usage information, transmitting, by the electronic device, the modified first usage information to the server, acquiring, by the server, second reconstruction information for reconstructing the second AI model, based on the transmitted first usage information, transmitting, by the server, the acquired second reconstruction information to the electronic device, and reconstructing, by the electronic device, the acquired second AI model, based on the transmitted second reconstruction information, to acquire a third AI model.

In accordance with an aspect of the disclosure, a system includes an electronic device configured to input at least one input data to a first AI model, to acquire at least one output data, and acquire first usage information, based on the acquired at least one output data. A server configured to receive the acquired first usage information from the electronic device, acquire first reconstruction information for reconstructing the first AI model, based on the received first usage information, reconstruct the first AI model, based on the acquired first reconstruction information, to acquire a second AI model, and transmit the acquired second AI model to the electronic device.

Each of the first AI model and the second AI model may include a neural network.

BRIEF DESCRIPTION OF THE DRAWINGS

The above and other aspects, and advantages of embodiments of the disclosure will be more apparent from the following description taken in conjunction with the accompanying drawings, in which:

FIG. 7B is a sequence diagram provided to explain an example case in which an artificial intelligence (AI) model is an image analysis model, according to an embodiment of the disclosure;

FIG. 10B is a diagram illustrating an example user interface (UI) screen for inputting usage information;

DETAILED DESCRIPTION

Figure 1:
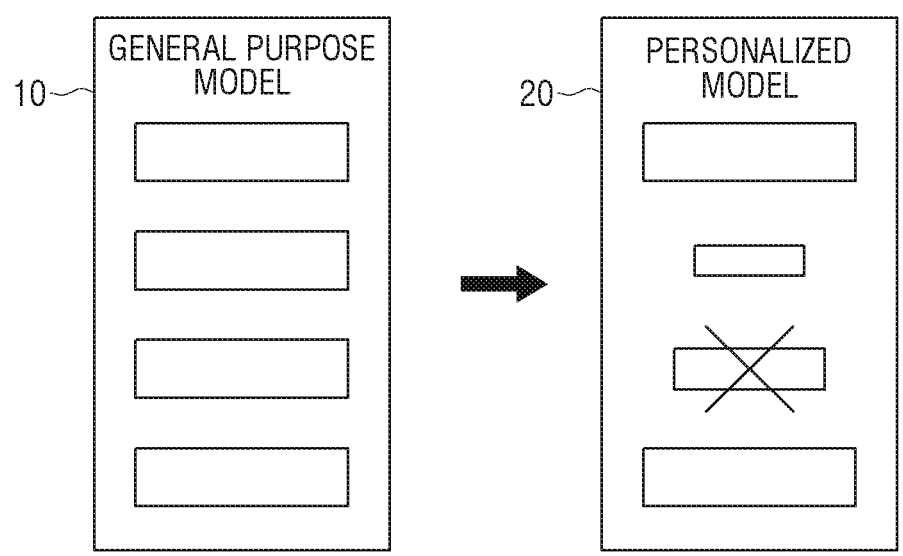
FIG. 1 is a diagram briefly illustrating an example of a method for reconstructing an artificial intelligence (AI) model, according to an embodiment of the disclosure.

An aspect of the disclosure is to provide a method for reconstructing an artificial intelligence (AI) model that is optimized for a user terminal.

Hereinafter, various embodiments of the disclosure will be described with reference to the accompanying drawings. However, the disclosure is not limited to the embodiments described hereinafter, but includes various modifications, equivalents, and/or alternatives of the embodiments of the disclosure. In relation to explanation of the drawings, similar drawing reference numerals may be used for similar constituent elements.

In the description, the term "has," "may have," "includes" or "may include" indicates existence of a corresponding feature (e.g., a numerical value, a function, an operation, or a constituent element such as a component), but does not exclude existence of an additional feature.

In the description, the term "A or B," "at least one of A or/and B," or "one or more of A or/and B" may include all possible combinations of the items that are enumerated together. For example, the term "A or B" or "at least one of A or/and B" may designate (1) at least one A, (2) at least one B, or (3) both at least one A and at least one B.

In the description, the terms "first, second, and so forth" are used to describe diverse elements regardless of their order and/or importance and to discriminate one element from other elements, but are not limited to the corresponding elements.

If it is described that an element (e.g., first element) is "operatively or communicatively coupled with/to" or is "connected to" another element (e.g., second element), the element may be connected to the other element directly or through still another element (e.g., third element). To the contrary, it will be understood that when an element (for example, a first element) is "directly coupled with/to" or "directly connected to" another element (for example, a second element), there is no intervening element (for example, a third element) between the element and another element.

The expression "configured to (or set to)" used in one or more embodiments of the disclosure may be replaced with "suitable for," "having the capacity to," "designed to," " adapted to," "made to," or "capable of" according to a context. The wording "configured to (set to)" may not necessarily denote or refer to "specifically designed to" in a hardware level. Instead, in circumstances, the term "device configured to (do)" may denote that the device is capable of "performing" something with another device or components. For example, the phrase "processor configured (or set) to perform A, B, and C" may denote or refer to a dedicated processor (e.g., embedded processor) for performing the corresponding operations or a generic-purpose processor (e.g., CPU or application processor) that can perform the corresponding operations through execution of one or more software programs stored in a memory device.

An electronic apparatus according to various embodiments may include any one or any combination of, for example, smartphone, tablet PC, mobile phone, video phone, e-book reader, desktop PC, laptop PC, netbook computer, workstation, server, PDA, portable multimedia player (PMP), MP3 player, medical device, camera, and a wearable device. In some embodiments, an electronic device may include, for example, any one or any combination of television, digital video disk (DVD) player, audio, refrigerator, air-conditioner, cleaner, oven, microwave, washing machine, air cleaner, set top box, home automation control panel, security control panel, media box (ex: Samsung HomeSync™ Apple TV™, or Google TV™), game console (ex: Xbox™, PlayStation™), e-dictionary, e-key, camcorder, and e-frame.

In this disclosure, the term "a user" may indicate a person using an electronic device or a device that uses an electronic device (for example, artificial intelligent electronic device).

Hereinafter, embodiments will be described in detail with reference to accompanying drawings.

FIG. 1 is a diagram briefly illustrating an example of a method for reconstructing an artificial intelligence (AI) model, according to an embodiment of the disclosure.

As illustrated in the left drawing of FIG. 1, a model initially included in an electronic device 100 may often be a general purpose artificial intelligence (AI) model 10. That is, an AI model having been included in the electronic device 100 ever since the electronic device 100 was launched may often be the general purpose AI model 10 for outputting a stable result values for various input data. Accordingly, the general purpose AI model 10 includes a node or layer for outputting result values for input data not in use by the user, and thus uses unnecessary resources, or uses unnecessary resources to determine features of input data not in use.

Accordingly, the electronic device 100 may reconstruct the general purpose AI model 10 on the basis of usage information of the user, and thereby prevent the use of unnecessary resources. For example, as illustrated in the right drawing of FIG. 1, the electronic device 100 may reconstruct the general purpose AI model 10 by deleting at least one layer from among a plurality of layers included in the general purpose AI model 10, removing unnecessary parts of at least one layer, or adding a new node to at least one layer.

In an embodiment, in a case that the general purpose AI model 10 is an image analysis model and the electronic device 100 is to recognize only a specific object (for example, egg, milk, carrot, etc.), the electronic device 100 may reconstruct the general purpose AI model 10 with a focus on information for identifying the specific object. In another embodiment, in a case that the general purpose AI model 10 is a language translation model, the electronic device 100 may reconstruct the general purpose AI model 10 based solely on information for translating languages in a specific context (for example, conversation in a travel destination, business conversation, etc.). In another embodiment, in a case that the general purpose AI model 10 is a voice recognition model, the electronic device 100 may reconstruct the general purpose AI model 10 based solely on information for identifying a specific word (for example, a word frequently used by the user) or a specific user (for example, a user frequently using the electronic device 100). In another embodiment, in a case that the general purpose AI model 10 is an AI model for removing noise, the electronic device 100 may reconstruct the general purpose AI model 10 on the basis of specific environment information (for example, structure information, size information and the like, of a room in which the electronic device 100 is located).

Through this method, the electronic device 100 may reconstruct the general purpose AI model 10 to acquire a personalized AI model 20. The personalized AI model 20 may be lighter than the general purpose AI model 10, or the processing speed may be faster.

Figure 2:
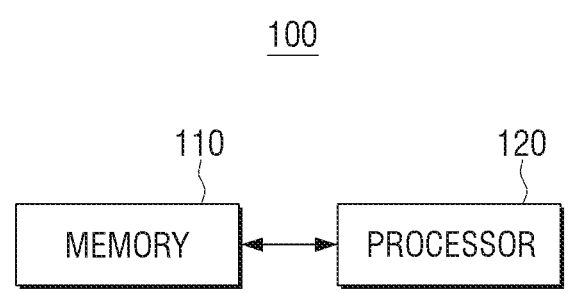
FIG. 2 is a block diagram briefly illustrating a configuration of an electronic device, according to an embodiment of the disclosure.

FIG. 2 is a block diagram briefly illustrating a configuration of an electronic device, according to an embodiment of the disclosure.

As illustrated in FIG. 2, an electronic device 100 may include a memory 110 and a processor 120.

The memory 110 may store one or more instructions or data regarding any one or any combination of the other elements of the electronic device 100. The memory 110 may be implemented as a non-volatile memory, a volatile memory, a flash memory, a Hard Disk Drive (HHD), or a Solid State Drive (SSD). The memory 110 may be accessed by the processor 120, and the processor 120 may perform reading/recording/revising/deleting/renewing of the data. According to an embodiment of the disclosure, the term of the memory may include the memory 110, read-only memory (ROM) and random access memory (RAM) within the processor 120, and a memory card attached to the electronic device 100 (e.g., micro secure digital (SD) card or memory stick).

The memory 110 may store an AI model, output data acquired based on input data input to the AI model, usage information acquired based on the output data, and reconstruction information for reconstructing the AI model acquired based on the usage information. In this case, the AI model may be constructed in consideration of an application field of a recognition model, an object of learning, computer performance of the device, etc. In addition, the AI model may be, for example, a model based on neural network. The AI model may be designed to simulate a human brain structure on the computer. The AI model may include a plurality of network nodes with weights to simulate neurons of a human neural network. The plurality of network nodes may respectively form a connection relationship so that a synaptic activity in which neurons exchange signals through synapse is simulated. The AI model may include, for example, a neural network model or a deep learning model developed from the neural network model. In the deep learning model, the plurality of network nodes may be located at different depths (or layers), and exchange data according to a convolutional connection relationship. For example, a model such as Deep Neural Network (DNN), Recurrent Neural Network (RNN) and Bidirectional Recurrent Deep Neural Network (BRDNN) may be used as an artificial intelligence (AI) model, but the example is not limited thereto.

The processor 120 may be electrically connected to the memory 110, and control overall operations and functions of the electronic device 100.

For example, the processor 120 may acquire at least one output data with respect to at least one input data input to a first artificial intelligence (AI) model, acquire usage information on the basis of the acquired at least one output data, acquire reconstruction information for reconstructing the AI model based on the acquired usage information, and reconstruct the first AI model on the basis of the reconstruction information to acquire a second artificial intelligence (AI) model.

In this case, the usage information may include any one or any combination of information relating to a usage pattern of the user, information relating to a place where the electronic device 100 is located, age information of a user of the electronic device 100, context information, information stored in the electronic device 100 and environment information. In this case, the information relating to the usage pattern of the user may include information relating to a use behavior occurring while the electronic device 100 is used by the user in a predetermined condition (for example, time, place or the like). In addition, the information relating to the place where the electronic device 100 is located may include a global positioning system (GPS) information of the electronic device 100, context information related to the GPS information (for example, context information such as a pharmacy, a shopping mall or a meeting room). The context information may be information regarding various contexts. For example, the context information may be various information related to a specific place or event, such as information relating to travel, information related to pharmacy and the like. In this case, the context information may include different information according to a type of AI model. For example, in a case that the AI model is an image analysis model, the context information related to travel may be information regarding a tourist spot. As another example, in a case that the AI model is a language translation model, the context information related to travel may be information regarding words frequently used in a travel destination. The information stored in the electronic device 100 may include, for example, an address book, a music list, an e-mail, a short message service (SMS) message, etc. The environment information may include, for example, any one or any combination of weather information, temperature information, structure information and size information of a place where the electronic device 100 is located.

For example, the usage information may denote various information according to a type and nature of the AI model. For example, in a case that the AI model is an AI model for image analysis, the usage information may be information relating to objects included in an image acquired through image analysis. As another example, in a case that the AI model is a model for language translation, the usage information may include any one or any combination of location information of the electronic device 100 (for example, GPS information), context information related to location (for example, context information such as pharmacy, shopping mall or meeting room), language information related to location (for example, information regarding a language used at the corresponding location) and schedule information stored in the electronic device 100. As another example, in a case that the AI model is an AI model included in a conversation system, the usage information may be category information for which text acquired through voice recognition are classified or category information for which user intentions (or tasks or commands) acquired through a natural language process are classified. As another example, in a case that the AI model is a voice recognition model, the usage information may be user identification information identifying a user who has uttered the input voice. As another example, in a case that the AI model is an AI model for processing noise, the usage information may be information related to a structure and size of a place where the electronic device 100 is located.

The reconstruction information may include any one or any combination of information relating to a structure of the second AI model, information relating to a weight of the second AI model and delta information for reconstructing the first AI model. The information relating to the structure of the AI model may denote information relating to a structure of layers included in the AI model or information relating to a connection relationship between layers. The delta information may include either one or both of structure information of the first AI model and the reconstructed second AI model and information relating to a difference between weights of the first AI model and the reconstructed second AI model.

In a case that the second AI model is acquired, the processor 120 may delete the first AI model from the memory 110. For example, in a case that the first AI model is changed to the second AI model and reconstructed, the processor 120 may delete data related to the first AI model. In a case that a new second AI model is acquired from the first AI model, the processor 120 may delete the previous first AI model so that the memory 110 may be efficiently used.

As described above, the processor 120 may reconstruct the first AI model to acquire the second AI model. That is, the first AI model is a general purpose AI model, and may acquire output data with respect to various input data. However, it has an AI model with a large computation amount and large size. In contrast, the reconstructed second AI model is a personalized AI model that may more accurately output data with respect to input data regarding usage information and may be a lightweight AI model.

For example, the processor 120 may acquire a first output data with respect to a first input data input to the reconstructed second AI model, in a case that a reliability of the first output data is less than or equal to a predetermined value, transmit the first input data to an external server 200, and acquire a second output data with respect to the first input data from the external server 200. That is, in a case that recognition probability values of the first output data acquired by inputting the first input data to the reconstructed second artificial intelligence model are less than or equal to a threshold or a first output data indicating that the first input data has not been recognized is acquired, the processor 120 may acquire an output data (second output data) with respect to the first input data from the external server 200. Through the process described above, in a case that an input data irrelevant to usage information is input and an inaccurate output data (first output data) is acquired, the processor 120 may acquire a second output data with respect to the first input data through a general purpose AI model (for example, first AI model) of the external server 200.

Further, the processor 120 may acquire second usage information on the basis of the second output data acquired from the external server 200, acquire second reconstruction information for reconstructing the second UI model based on the acquired second usage information, and reconstruct the second UI model based on the second reconstruction information to acquire a third AI model. That is, in a case that a first input data not corresponding to the previously-acquired first usage information is input, the processor 120 may acquire the second usage information including the first input data and reconstruct an AI model.

In addition, in a case that any one of at least one output data is output a number of times less than a threshold under a predetermined condition (for example, time or location), the processor 120 may acquire third usage information excluding any one of the at least one output data, acquire third reconstruction information for reconstructing the second AI model based on the acquired third usage information, and reconstruct the second UI model based on the third reconstruction information to acquire a fourth AI model. That is, in contrast to when the third AI model is acquired, the processor 120 may acquire third usage information excluding an output data with respect to an input data not in use, and reconstruct an AI model. Through the various reconstruction processes described above, the processor 120 may acquire a personalized and lightened AI model.

As described above, the AI model may be an AI model according to various purposes. For example, the AI model may include an AI model of various types such as an AI model for image analysis, an AI model for language translation, an AI model for voice recognition, an AI model for natural language processing, an AI model for noise removal and the like.

Figure 3:
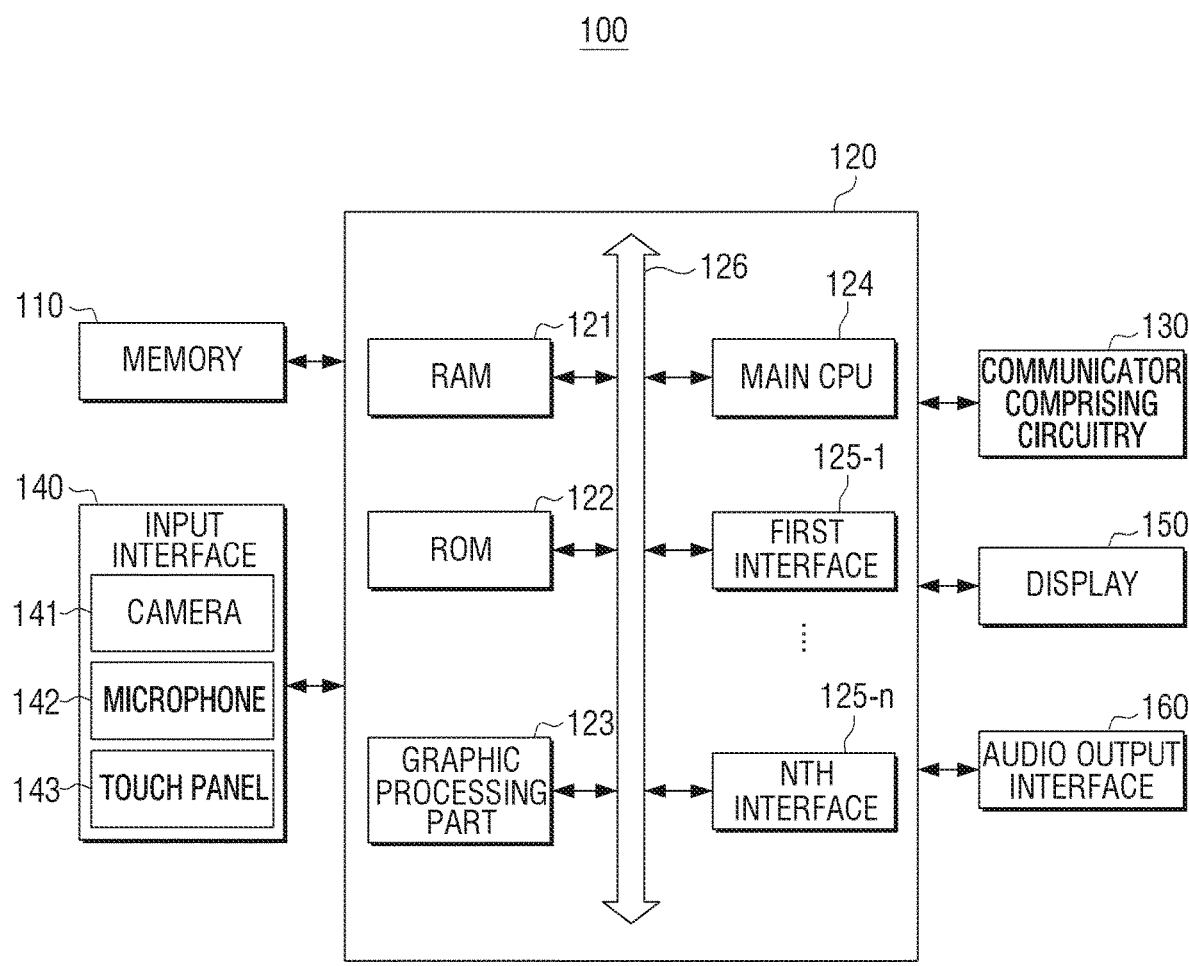
FIG. 3 is a block diagram illustrating in detail a configuration of an electronic device, according to an embodiment of the disclosure.

FIG. 3 is a block diagram illustrating in detail a configuration of an electronic device, according to an embodiment of the disclosure.

As illustrated in FIG. 3, the electronic device 100 may further include a communicator including a circuitry 130, an input interface 140, a display 150 and an audio output interface 160, in addition to the memory 110 and the processor 120. However, the example is not limited to the above-mentioned elements, and some elements may be added or omitted according to necessity.

The communicator 130 is a configuration for performing communication with another electronic device. The communicator 130 may be communicatively connected to another electronic device via a third device (for example, a repeater, a hub, an access point, a server, a gateway or the like). The wireless communication may include, for example, a cellular communication utilizing any one or any combination of 5G network, LTE, LTE Advance (LTE-A), code division multiple access (CDMA), wideband CDMA (WCDMA), universal mobile telecommunications system (UMTS), Wireless Broadband (WiBro), Global System for Mobile Communications (GSM) or the like. According to one embodiment, the wireless communication may include, for example, any one or any combination of wireless fidelity (WiFi), Bluetooth, Bluetooth low power (BLE), Zigbee, near field communication (NFC), Magnetic Secure Transmission, Radio Frequency (RF), and body area network (BAN). The wired communication may include, for example, any one or any combination of universal serial bus (USB), high definition multimedia interface (HDMI), recommended standard 232 (RS-232), power line communication and plain old telephone service (POTS). The network via which a wired or wireless communication is performed may include a telecommunication network, for example, any one or any combination of a computer network (e.g., LAN or WAN), the Internet and a telephone network.

The communicator 130 may acquire output data with respect to input data from the external server 200. Further, in a case that reconstruction of an AI model is operated in the external server 200, the electronic device 100 may acquire reconstruction information or the reconstructed AI model via the communicator 130.

The input interface 140 may be configured to acquire input of a user command. The input interface 140 may include a camera 141, a microphone 142, a touch panel 143, etc. The camera 141 may be configured to acquire image data surrounding the electronic device 100. The camera 141 may capture a still image and a moving image. For example, the camera 141 may include one or more image sensors (for example, a front sensor or a rear sensor), a lens, an image signal processor (ISP) or a flash (for example, LED or xenon lamp). The image data acquired through the camera 141 may be input as an input data of an AI model. The microphone 142 may be configured to acquire sound around the electronic device 100. The microphone 142 may acquire input of an external acoustic signal and acquire electrical voice information. The microphone 142 may utilize various noise removal algorithms for removing noise occurring in a process of acquiring input of an external acoustic signal. The audio data acquired through the microphone 142 may be input as an input data of an AI model. The touch panel 143 may be configured to acquire various user inputs. The touch panel 143 may acquire input of data by a user manipulation. The touch panel 143 may be configured in combination with a display that will be described later. A user command input through the touch panel 143 may be a command for inputting usage information. The input interface 140 may be configured as various elements for inputting various data, in addition to the camera 141, microphone 142 and touch panel 143 described above.

The display 150 may be configured to output various images. The display 150 for providing various images may be implemented as a display panel of various forms. For example, the display panel may be implemented with various display technologies such as liquid crystal display (LCD), organic light emitting diode (OLED), active-matrix organic light-emitting diode (AM-OLED), liquid crystal on silicon (LcoS) or digital light processing (DLP). The display 150 may be implemented in a flexible display form, which may be combined with any one or any combination of a front surface area, a lateral surface area and a rear surface area of the electronic device 100.

The display 150 may display a user interface (UI) for adding or changing usage information. In this case, usage information that can be added through the UI is usage information that cannot be acquired from output data, which may be, for example, any one or any combination of information regarding usage pattern of the electronic device 100, information related to a place where the electronic device 100 is located, age information of user of the electronic device, context information and environment information. When a user command for adding new usage information is input through a UI displayed on the display 150, the processor 120 may acquire fourth reconstruction information for reconstructing the second UI model based on the new usage information, and reconstruct the second UI model based on the fourth reconstruction information to acquire a fifth AI model. As another example, the electronic device 100 may delete usage information not used as output data, according to the user input acquired through the UI.

The audio output interface 160 may be configured to output not only various audio data for which various processing operations such as decoding, amplification and noise filtering are performed by an element for performing audio processing (for example, CPU or exclusive hardware), but also various alert sounds or voice messages. An audio processing part is an element for processing audio data. The audio processing part may perform various processing with respect to audio data, such as decoding, amplification, noise filtering and the like. Audio data processed by the audio processing part may be output to the audio output interface 160. The audio output interface may be implemented to be speaker; this is one of various embodiments of the disclosure. The audio output interface may be implemented to be output component that can output the audio data. In a case that output data of an AI model is outputted as audio, the audio output interface 160 may output audio corresponding to the output data.

The processor 120 may be configured to control overall operations of the electronic device 100, as described above. The processor 120 may include a RAM 121, a ROM 122, a graphic processing part 123, a main central processing unit (CPU) 124, first through nth interfaces 125-1 through 125-n, and a bus 126. The RAM 121, the ROM 122, the graphic processing part 123, the main central processing unit (CPU) 124 and the first through nth interfaces 125-1 through 125-n may be connected to each other via the bus 126.

The ROM 122 may store a set of instructions for system booting. When a turn-on command is input and power is supplied, the main CPU 124 may copy an O/S stored in the memory to the RAM 121 according to the instructions stored in the ROM 122, and boot the system by executing the O/S. When booting is completed, the main CPU 124 may copy various application programs stored in the memory to the RAM 121, and execute the application programs copied to the RAM 121 and perform various operations.

For example, the main CPU 124 may access the memory 110 and perform booting using the O/S stored in the memory 110. The main CPU 124 may perform various operations using a variety of programs, contents, data, etc. stored in the memory 110.

The first through nth interfaces 125-1 to 125-n may be connected to the various elements described above. One of the interfaces may be a network interface that is connected to an external device via a network.

Figure 4A:
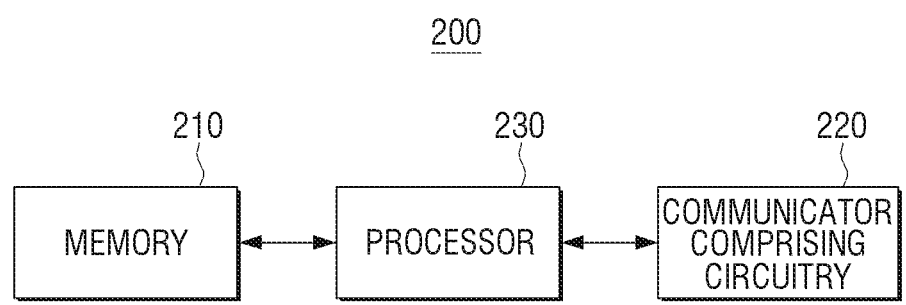
FIG. 4A is a block diagram briefly illustrating a configuration of an external server, according to an embodiment of the disclosure.
Figure 4B:
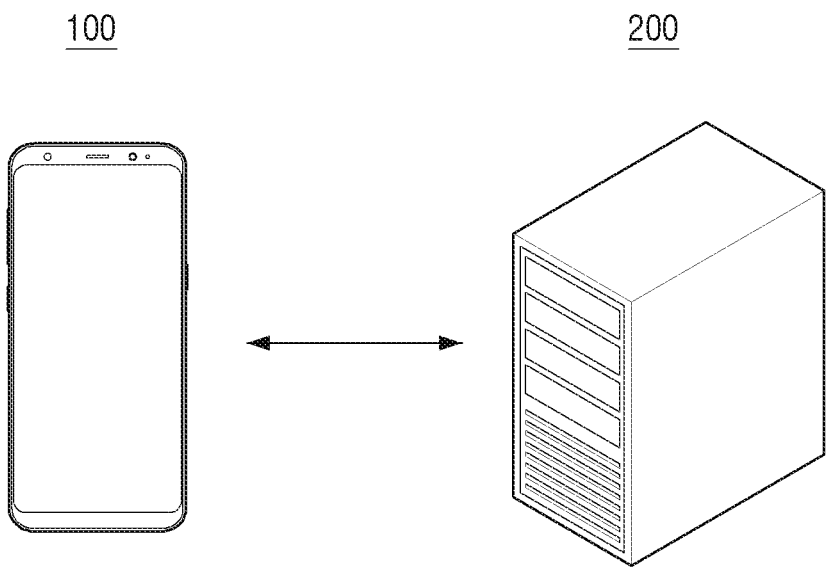
FIG. 4B is a diagram provided to explain an embodiment in which an electronic device and an external server are interlocked with each other and operated, according to an embodiment of the disclosure.

FIG. 4A is a block diagram briefly illustrating a configuration of an external server, according to an embodiment of the disclosure. FIG. 4B is a diagram provided to explain an embodiment in which an electronic device and an external server are interlocked with each other and operated, according to an embodiment of the disclosure.

As illustrated in FIG. 4A, an external server 200 may include a memory 210, a communicator including a circuitry 220, and a processor 230. The structures, functions and operations of the memory 210 and the communicator 220 are similar to those of the memory 110 and communicator 130 of the electronic device 100 described above.

That is, the memory 210 may store one or more instructions or data regarding at least one other element of the server 200. For example, the memory 210 may be implemented as non-volatile memory, volatile memory, flash-memory, a hard disk drive (HDD), a solid state drive (SSDI), etc. The memory 210 may be accessed by the processor 230 and operations such as reading, writing, modification, deletion, update, etc., of data may be performed by the processor 230.

The memory 210 may store information regarding a first AI model that is a general purpose AI model. In addition, in a case that the electronic device 100 acquires output data using the first AI model stored in the server 200, the memory 210 may store output data acquired based on the input data input to the first AI model, usage information acquired based on the output data, and reconstruction information for reconstructed an AI model acquired based on the usage information. Further, the memory 210 may further include usage information regarding the reconstructed second AI model through the fourth AI model, reconstruction information, etc. In this case, in a case that the second through fourth AI models are acquired from the electronic device 100, the memory 210 may acquire the second through fourth AI models from the electronic device 100, and store them. However, in a case that the second through fourth AI models are acquired from the external sever 200, the memory 210 may store the acquired second through fourth AI models.

The communicator 220 is a configuration for performing communication with another electronic device. The communicator 220 may be communicatively connected to another electronic device via a third device (for example, a repeater, a hub, an access point, a server, a gateway or the like). The communicator 220 may communicate with an external device by the various wired or wireless communication schemes described above. For example, the communicator 220 may acquire a first input data from the electronic device 100. However, the example is not limited thereto, and as described above, the communicator 220 may further acquire the second through fourth AI models, usage information regarding the second through fourth AI models, reconstruction information, etc.

The processor 230 may be electrically connected to the memory 210, and control overall operations and functions of the external server 200.

For example, in a case that a control signal requesting a first input data and an output data with respect to the first input data is acquired from the electronic device 100, the processor 230 may acquire a second output data that is output by inputting the first input data to the first AI model. The processor 203 may transmit the acquired second output data to the electronic device 100 via the communicator 220. That is, in a case that the electronic device 100 stores only the second AI model and it is impossible to acquire an accurate output data with respect to the first input data, the processor 230 may acquire the second output data that is an accurate output data with respect to the first input data, using the first AI model in place of the electronic device 100, and transmit the acquired second output data to the electronic device 100.

As described above, the external server 200 may perform all or part of the operations performed by the electronic device 100 instead of the electronic device 100. That is, as illustrated in FIG. 4B, the electronic device 100 and the external server 200 may be interlocked with each other and operated.

In an embodiment, the electronic device 100 may acquire at least one output data with respect to at least one input data input to the first AI model, and transmit first usage information acquired based on the acquired output data to the external server 200. The external server 200 may acquire first reconstruction information for reconstructing the first AI model based on the first usage information acquired from the electronic device 100, and transmit the acquired first reconstruction information to the electronic device 100. The electronic device 100 may reconstruct the first AI model based on the acquired first reconstruction information to acquire a second AI model.

In a case that the first input data that cannot be recognized by the reconstructed second AI model is input to the electronic device 100, the external server 200 may acquire the first input data and acquire second reconstruction information. For example, when the first input data is input to the second AI model of the electronic device 100, the electronic device 100 may identify a reliability of the first output data with respect to the first input data. If the reliability of the first output data is less than or equal to a predetermined value (or, if the first output data indicating that the first input data has not been recognized is output), the electronic device 100 may transmit the first input data to the external server 200. The external server 200 may input the acquired first input data to the first AI model of the external server 200 and acquire a second output data, acquire second usage information based on the second output data, and acquire second reconstruction information based on the second usage information and transmit the acquired second reconstruction information to the electronic device 100. The electronic device 100 may reconstruct the second AI model based on the acquired second reconstruction information to acquire a third AI model.

In a case that the first input data that cannot be recognized by the reconstructed second AI model is input to the electronic device 100, the external server 200 may acquire the first input data, and transmit a second output data with respect to the acquired first input data to the electronic device 100. That is, it is faster and more accurate that the external server 200 transmits the second output data with respect to the first input data to the electronic device 100 than the electronic device 100 reconstructing the second AI model to an AI model capable of recognizing the first input data, and acquiring the second output data with respect to the first input data. Thus, the external server 200 may transmit the second output data to the electronic device 100. The electronic device 100 may output the acquired second output data.

Figure 5A:
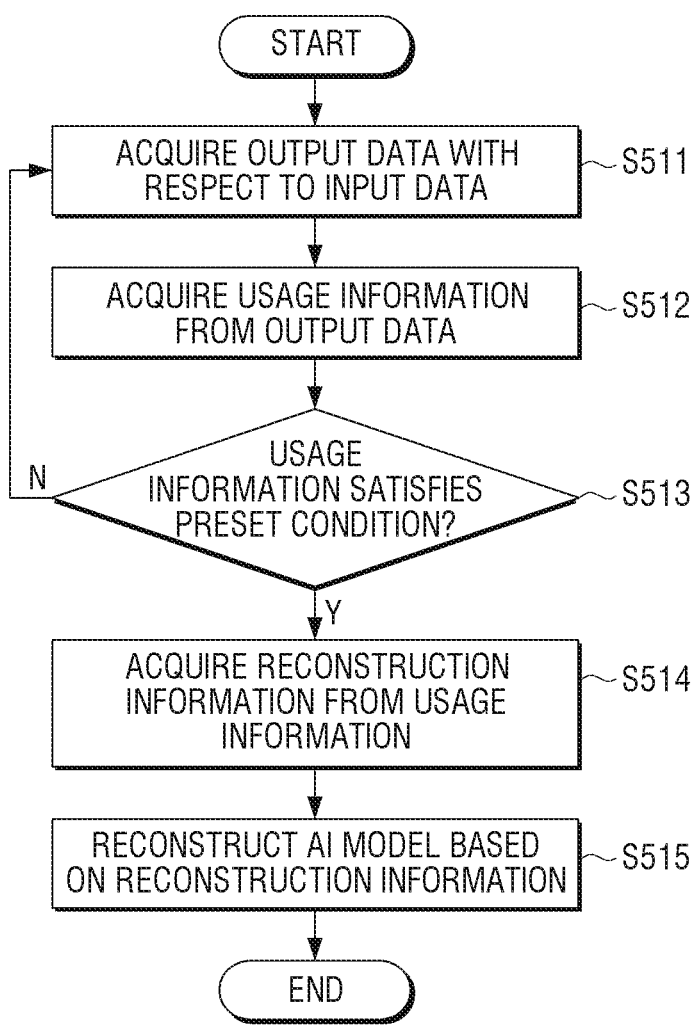
FIG. 5A is a flowchart provided to explain an operation of an electronic device and an external server, according to various embodiments of the disclosure.
Figure 5B:
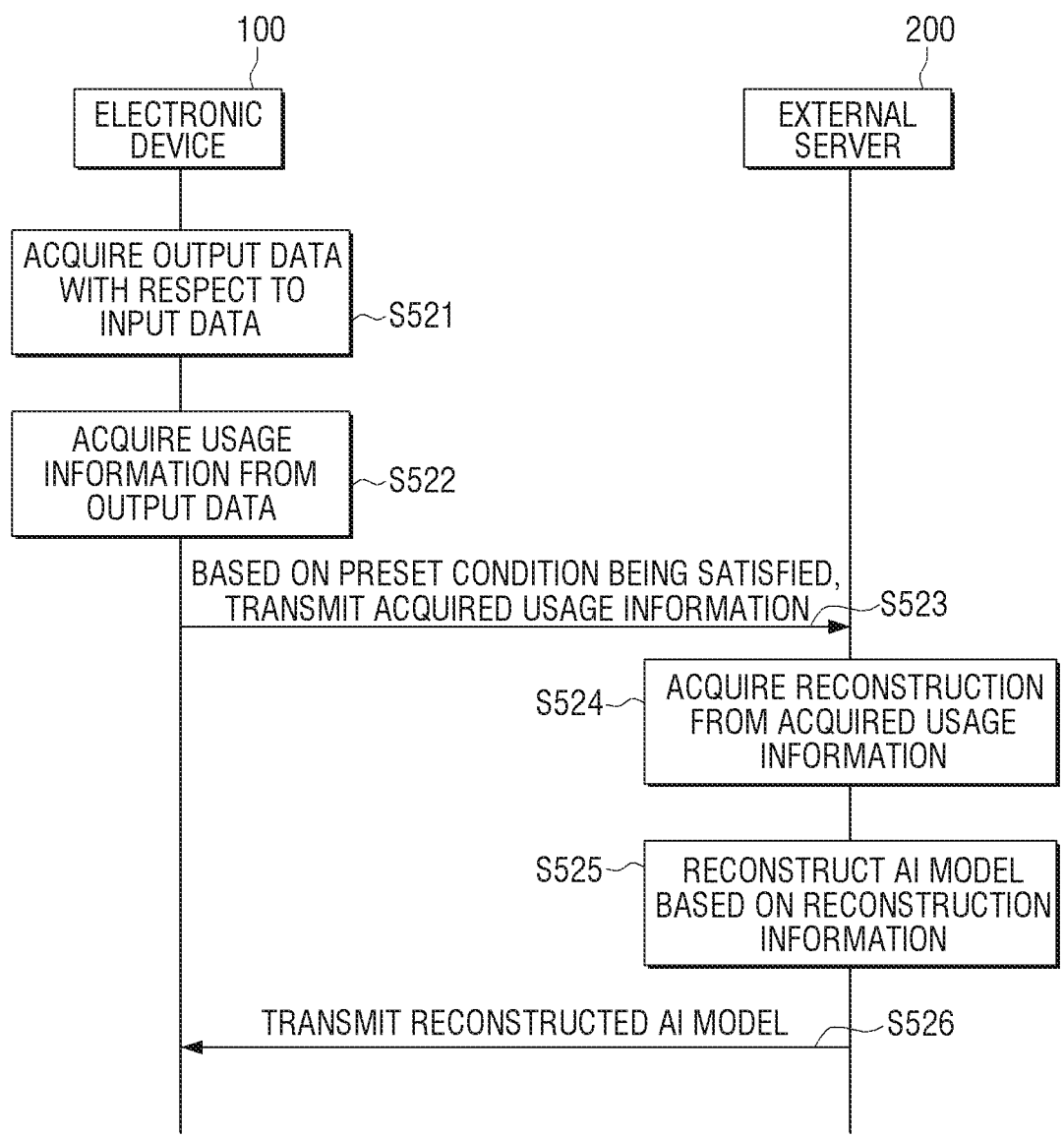
FIG. 5B is a sequence diagram provided to explain an operation of an electronic device and an external server, according to various embodiments of the disclosure.
Figure 5C:
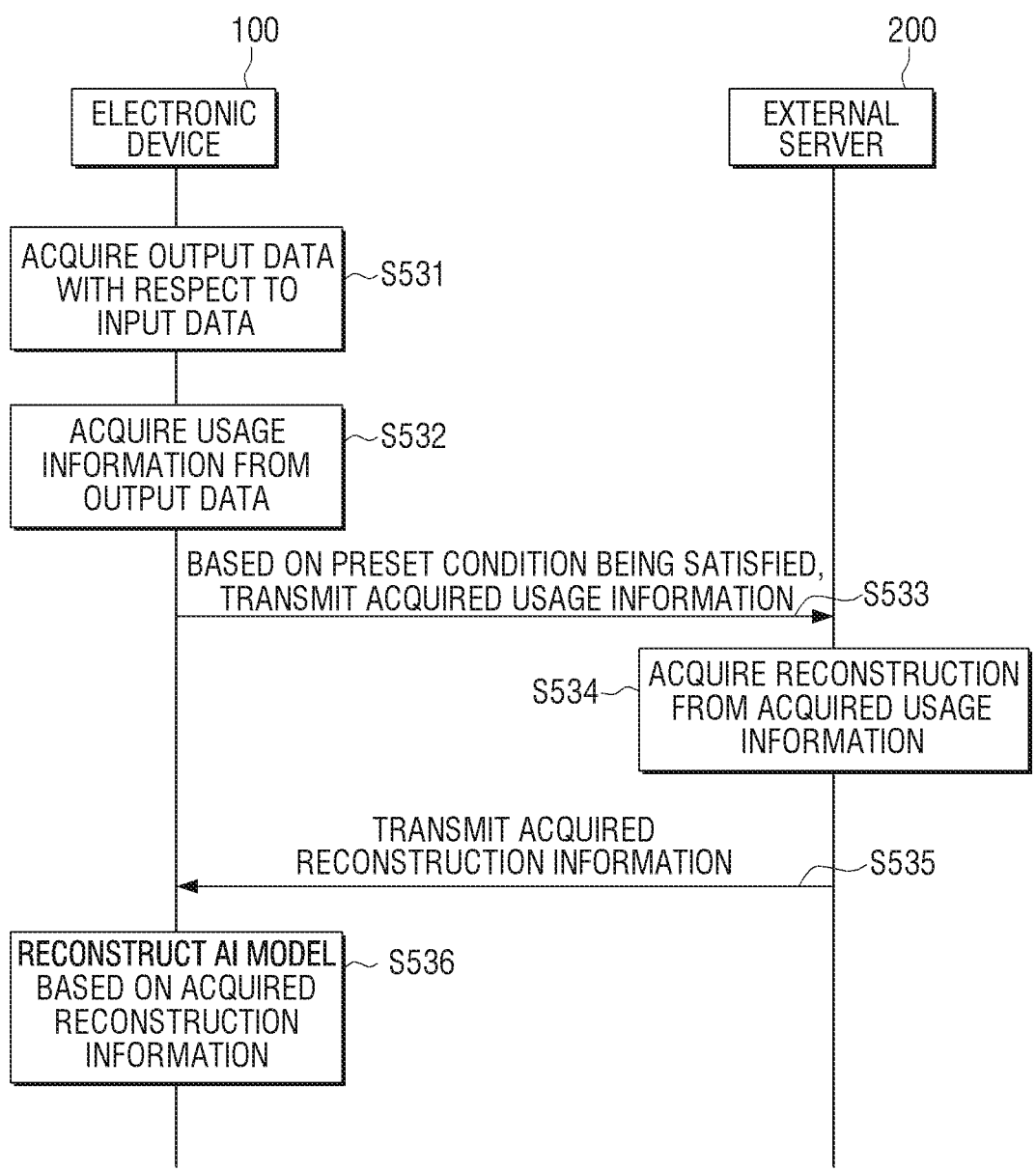
FIG. 5C is a sequence diagram provided to explain an operation of an electronic device and an external server, according to various embodiments of the disclosure.

FIG. 5A is a flowchart provided to explain an operation of an electronic device and an external server, according to various embodiments of the disclosure. FIG. 5B is a sequence diagram provided to explain an operation of an electronic device and an external server, according to various embodiments of the disclosure. FIG. 5C is a sequence diagram provided to explain an operation of an electronic device and an external server, according to various embodiments of the disclosure.

As illustrated in FIG. 5A, the electronic device 100 may acquire, on its own, an output data output by inputting an input data to an AI model, usage information acquired based on the output data, and reconstruction information acquired based on the usage information, and reconstruct the AI model based on the acquired reconstruction information.

That is, the electronic device 100 may acquire an output data with respect to an input data, at operation S511. For example, the electronic device 100 may input input data to a first AI model to acquire an output data.

The electronic device 100 may acquire usage information from the output data, at operation S512. As described above, the usage information may include any one or any combination of information regarding usage pattern of a user, information related to a place where the electronic device 100 is located, age information of user of the electronic device, context information and environment information.

The electronic device may identify whether the usage information satisfies a predetermined condition or present condition, at operation S513. The predetermined condition may denote a condition for acquiring usage information for acquiring reconstruction information from among a plurality of pieces of usage information acquired by the electronic device 100. For example, the predetermined condition may include various conditions such as a condition as to a specific output data is output less than a threshold during a predetermined period, a condition as to whether an output data is output larger than or equal to a threshold while the electronic device 100 is present at a predetermined location, a condition as to whether a specific output data is set by a user and the like.

In a case that the usage information does not satisfy the predetermined condition, S513-N, the electronic device 100 may return to the operation S511, and acquire output data with respect to the input data until the predetermined condition is met. In a case that the usage information satisfies the predetermined condition, S513-Y, the electronic device 100 may acquire reconstruction information from the usage information satisfying the predetermined condition, at operation S514. For example, when usage information from which an output data corresponding to 20 out of 1000 categories capable of being output by the first AI model that is a general purpose AI model is acquired, the electronic device 100 may acquire reconstruction information for reconstructing the first AI model to a second AI model capable of outputting 20 categories. As described above, the reconstruction information is information for reconstructing an AI model, which may include any one or any combination of information regarding a structure of the second AI model, information regarding a weight of the second AI model and delta information for reconstructing the first AI model.

The electronic device 100 may reconstruct the AI model based on the acquired reconstruction information, at operation S515.

As illustrated in FIGS. 5B and 5C, some of the operations of the electronic device 100 in FIG. 5A may be performed in the external server 200 as well.

That is, as illustrated in FIG. 5B, the external server 200 may acquire the reconstruction information, and reconstruct the AI from the acquired reconstruction information and transmit the reconstructed AI model to the electronic device 100.

For example, the electronic device 100 may acquire an output data with respect to an input data, at operation S521. The electronic device 100 may acquire usage information from the output data, at operation S522. When the usage information satisfies the predetermined condition or present condition, the electronic device 100 may transmit the acquired usage information satisfying the predetermined condition or present condition to the external server, at operation S523. When the predetermined condition is not satisfied, it is possible to acquire output data until the predetermined condition is acquired, as in the operation S513-N of FIG. 5A. At the operation S523, the external server 200 may acquire an AI model stored in the electronic device 100. That is, the external server 200 may acquire an AI model to be reconstructed from the electronic device 100. However, the example is not limited thereto, and the external server 200 may acquire only information regarding an AI model to be reconstructed from the electronic device 100.

The external server 200 may acquire reconstruction information from the usage information acquired from the electronic device 100, at operation S524. The external server 200 may reconstruct an AI model based on the acquired reconstruction information, at operation S525. The external server 200 may transmit the reconstructed AI model to the electronic device 100, at operation S526. In this case, the electronic device 100 may delete the previous AI model, and store the AI model acquired from the external server 200.

In another embodiment, as illustrated in FIG. 5C, the electronic device 100 may acquire an output data with respect to an input data, at operation S531. The electronic device 100 may acquire usage information from the output data, at operation S532. When the usage information satisfies the predetermined condition or preset condition, the electronic device 100 may transmit the acquired usage information satisfying the predetermined condition or preset condition to the external server, at operation S533. The external server 200 may acquire reconstruction information from the usage information acquired from the electronic device 100, at operation S534. The external server 200 may transmit the acquired reconstruction information to the electronic device 100, at operation S535. The electronic device 100 may reconstruct the AI model based on the acquired reconstruction information, at operation S536.

That is, in FIG. 5C, unlike FIG. 5B, the electronic device 100 may acquire reconstruction information from the external server 200, and directly reconstruct the AI model.

Besides the embodiments of FIGS. 5B and 5C, the external server 200 may perform any one or any combination of an operation of inputting an input data to an AI model and acquiring an output data, an operation of acquiring usage information based on the output data (or context information, environment information, etc.), an operation of acquiring reconstruction information based on the usage information, and an operation of reconstructing the AI based on the reconstruction information. For example, the electronic device 100 may initially, when an AI model is to be used without storing it in the electronic device 100, transmit an input data to the external server 200, and acquire an output data from the external server 200. The external server 200 may acquire usage information based on an output data corresponding to the input data acquired from the electronic device 100, acquire reconstruction information based on the usage information, and reconstruct an AI model based on the reconstruction information. The external server 200 may transmit the reconstructed AI model to the electronic device 100, and the electronic device 100 may use the reconstructed AI model acquired from the external server 200.

Figure 6A:
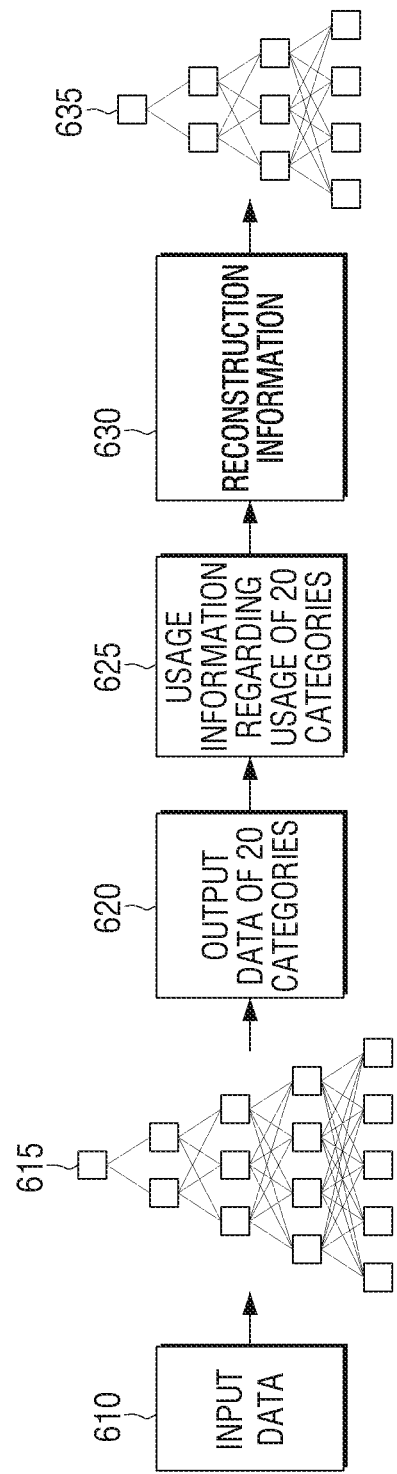
FIG. 6A is a diagram provided to explain an example of a method for reconstructing an artificial intelligence (AI) model, according to an embodiment of the disclosure.
Figure 6B:
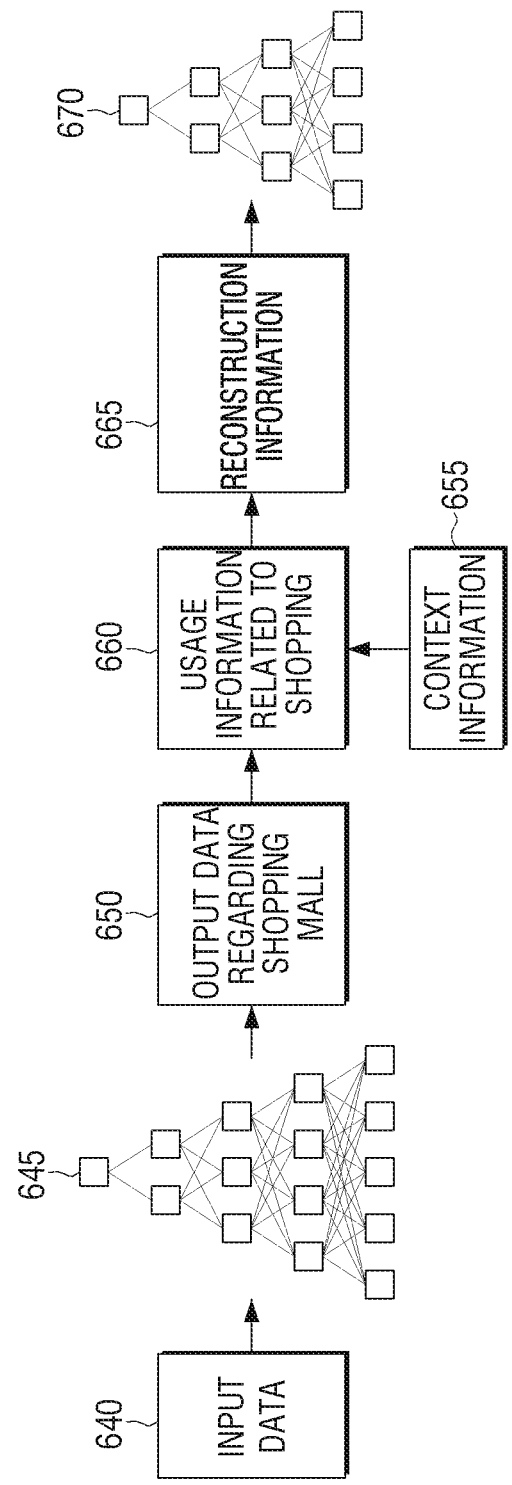
FIG. 6B is a diagram provided to explain an example of a method for reconstructing an artificial intelligence (AI) model, according to an embodiment of the disclosure.

FIG. 6A is a diagram provided to explain an example of a method for reconstructing an artificial intelligence (AI) model, according to an embodiment of the disclosure. FIG. 6B is a diagram provided to explain an example of a method for reconstructing an artificial intelligence (AI) model, according to an embodiment of the disclosure.

An AI model illustrated in FIG. 6A may be an AI model for image analysis. The electronic device 100 may acquire an input data 610. In this case, the input data may be a still image data including at least one object. However, the example is not limited thereto, and the input data may be a moving image data.

The electronic device 100 may input a plurality of input data 610 to a first AI model 615 in a predetermined condition (for example, a predetermined time or location), and acquire a plurality of output data. The first AI model 615 is an artificial intelligence (AI) model that is capable of outputting 1000 categories of output data (that is, an artificial intelligence model capable of recognizing 1000 objects), which may include an N number of layers (for example, core layer, convolutional layer, pooling layer, locally-connected layer, recurrent layer, embedding layer, merge layer, advanced activations layer, normalization layer, noise layer, etc.) and a first weight value corresponding to each of the N number of layers, and may include 1000 classifier nodes for classifying the 1000 categories. In addition, the first AI model 615 is an output data, which may output information regarding an object included in image data.

For example, the plurality of output data acquired through the first AI model 615 in the predetermined condition may be output data 620 of 20 categories. The output data of 20 categories may include information regarding 20 types of objects. That is, the electronic device 100 may recognize 20 objects through the first AI model 615 in the predetermined condition. In this case, the electronic device 100 may store the output data acquired in the predetermined condition in a form of histogram.

The electronic device 100 may acquire usage information 625 regarding the 20 categories based on the output data 620 of 20 categories. For example, the electronic device 100 may acquire usage information regarding a category (for example, a type of object) recognized at least a predetermined number of times (for example, twice) using a histogram stored in the electronic device 100.

The electronic device 100 may acquire reconstruction information 630 based on the acquired usage information 625. The reconstruction information 630 may be any one or any combination of structure information (for example, the number of layers) of a second AI model capable of outputting 20 categories of output data, a weight value, or a delta value of the previous first AI model 615 and an AI model capable of outputting 20 categories of output data. For example, the reconstruction information 630 may include an N-2 number of layers, and include weight values respectively corresponding to the N-2 number of layers. The reconstruction information 630 may be information regarding an AI model capable of including 20 classifier nodes. The reconstruction information 630 may be acquired by the electronic device 100. However, the example is not limited thereto, and it may be acquired by the external server 200. That is, the electronic device 100 may transmit 20 categories of usage information to the external server 200, and acquire, from the external server 200, reconstruction information acquired based on the 20 categories of usage information.

The electronic device 100 may reconstruct the first AI model 615 to a second AI model 635 on the basis of the reconstruction information. The second AI model 635 may include fewer layers than the first AI model 615, and include less classifier nodes, and thus may be lightened as compared with the first AI model 615. For example, the second AI model 635 may include an N-2 number of layers, include second weight values respectively corresponding to the N-2 number of layers, and include 20 classifier nodes.

In this case, the electronic device 100 may delete a file storing information regarding the first AI model 615 stored in the memory 110, and store a file storing information regarding the second AI model 635 (that is, reconstruction information) in the memory 110. Alternatively, the electronic device 100 may update the previously-executed first AI model 615 to the second AI model 635 on the basis of the reconstruction information.

An AI model illustrated in FIG. 6B may be an AI model for language translation from among AI models for voice processing and language understanding. The electronic device 100 may acquire an input data 640. The input data may be voice data of a user.

The electronic device 100 may input a plurality of input data 640 to a first AI model 645 in a predetermined condition (for example, a predetermined time or location), and acquire a plurality of output data. The first AI model 645 may be an AI model for language translation related to hospital, which may include an embedding layer including an N number of word lists related to hospital. In addition, the first AI model 645 is an output data, which may output translation information regarding a user voice.

For example, some of the plurality of output data acquired through the first AI model 645 in the predetermined condition may acquire an output data 650 regarding a shopping mall. For example, the electronic device 100 may acquire a text related to a shopping mall (for example, a name, location, operating hours of the shopping mall) as an output data.

Alternatively, the electronic device 100 may acquire context information 655 related to the shopping mall. For example, the electronic device 100 may acquire, as the context information 655, any one or any combination of location information of the electronic device 100 (for example, GPS information), context information related to location (for example, whether the electronic device is located in the shopping mall, etc.), language information related to location (for example, information regarding a language used at the corresponding location), schedule information stored in the electronic device 100, and information set by the user through the UI.

The electronic device 100 may acquire usage information related to shopping 660 based on some of the output data 650 output through the first AI model 645 and the context information 655. In this case, the electronic device 100 may acquire the usage information related to shopping 660 based on one of some of the output data 650 output through the first AI model 645 or the context information 655.

The electronic device 100 may acquire reconstruction information 665 based on the acquired usage information 660. The reconstruction information 665 may be any one or any combination of structure information (for example, the number of layers) of a second AI model capable of performing language translation related to shopping, a weight value, or a delta value of the previous first AI model 645 and an AI model capable of outputting language translation related to shopping. For example, the reconstruction information 665 may be information regarding the second AI model 670 including an embedding layer including an M number of word lists related to shopping. In this case, the second AI model 670 may include a different number of layers or different weight values from the first AI model 645.

The reconstruction information 665 may be acquired by the electronic device 100. However, the example is not limited thereto, and it may be acquired by the external server 200. That is, the electronic device 100 may transmit usage information related to shopping to the external server 200, and acquire, from the external server 200, reconstruction information acquired based on the usage information related to shopping.

The electronic device 100 may reconstruct the first AI model 645 to the second AI model 670 on the basis of the reconstruction information 665. The second AI model 670 may include an embedding layer including a different word list from the first AI model 645, and include a different number of layers from the first AI model 645. That is, the electronic device 100 may perform language translation using an AI model optimized according to usage information of the user.

In this case, the electronic device 100 may delete a file storing information regarding the first AI model 645 stored in the memory 110, and store a file storing information regarding the second AI model 670 (that is, reconstruction information) in the memory 110. Alternatively, the electronic device 100 may update the previously-executed first AI model 645 to the second AI model 670 on the basis of the reconstruction information. FIGS. 7A, 7B, 8A, 8B, 9A, 9B and 9C are diagrams provided to explain an example method for reconstructing an artificial intelligence (AI) model, according to various embodiments of the disclosure.

Figure 7A:
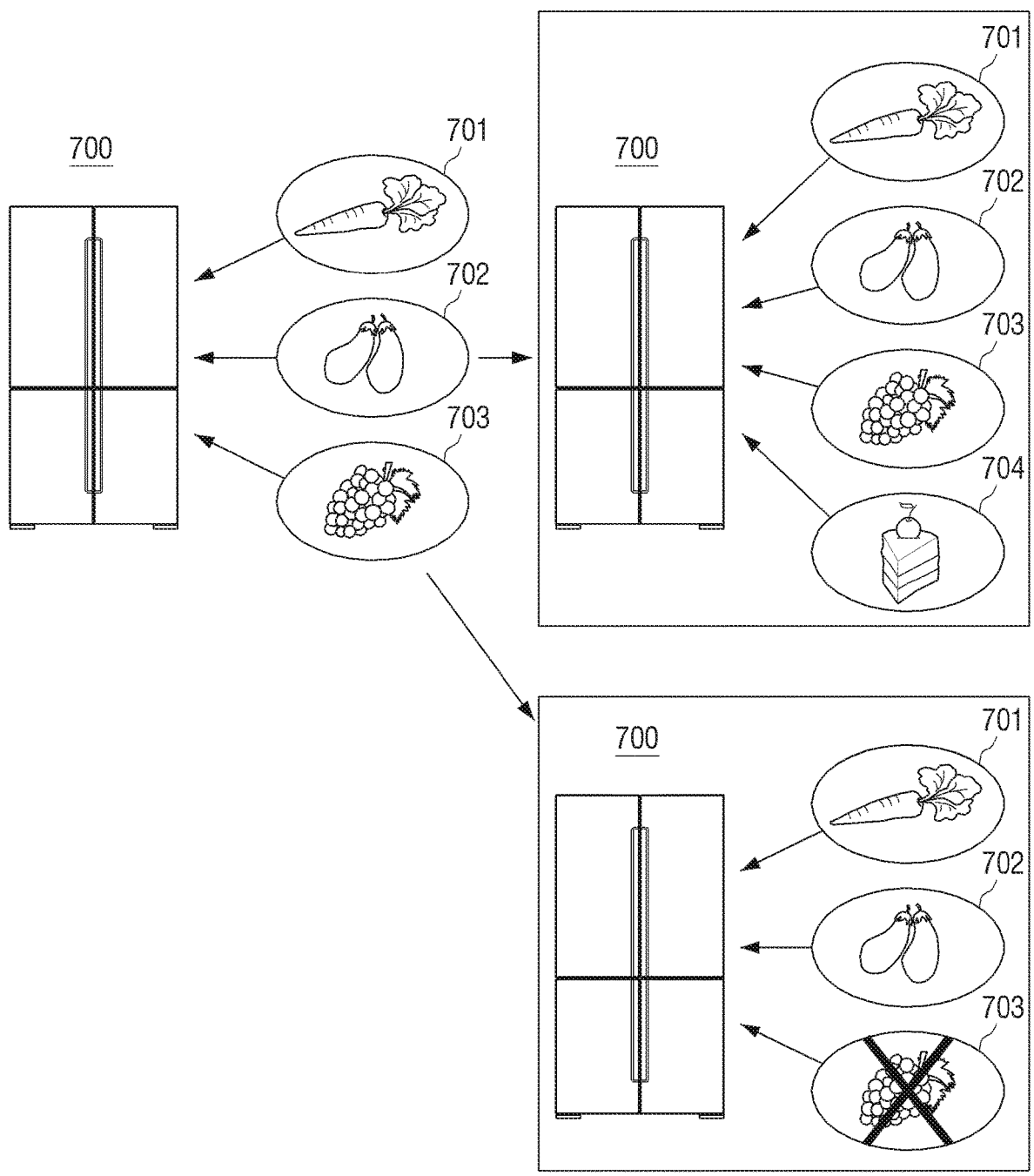
FIG. 7A is a diagram provided to explain an example case in which an artificial intelligence (AI) model is an image analysis model, according to an embodiment of the disclosure.

FIG. 7A is a diagram provided to explain an example case in which an artificial intelligence (AI) model is an image analysis model, according to an embodiment of the disclosure. FIG. 7B is a sequence diagram provided to explain an example case in which an artificial intelligence (AI) model is an image analysis model, according to an embodiment of the disclosure.

As illustrated in FIG. 7A, the electronic device 100 may be a refrigerator, and an AI model may be an image analysis model for identifying a type of products inside the refrigerator.

The electronic device 100 may acquire data on various types of products stored in the electronic device 100, using a first AI model. For example, the electronic device 100 may input an image data generated by capturing various food types to the first AI model, and acquire information regarding the products as output data.

In a case that the acquired output data satisfies a predetermined condition, the electronic device 100 may acquire usage information based on the output data satisfying the predetermined condition, and reconstruct the first AI model based on the acquired usage information to acquire a second AI model. The predetermined condition may be, for example, a product captured more than a predetermined number of times during a predetermined period. For example, as illustrated in the left drawing of FIG. 7A, the electronic device 100 may acquire information regarding first through third products 701 to 703 present inside the electronic device 100 through the first AI model. The electronic device 100 may acquire usage information based on the information regarding the first through third products 701 to 703, acquire reconstruction information for identifying the first through third products 701 to 703 on the basis of the acquired usage information, and acquire a second AI model that is reconstructed based on the acquired reconstruction information.

A new product may be added to the electronic device 100 according to usage of the user, or a product may be consumed and disappear. That is, a fourth product 704 satisfying a predetermined condition may be added according to usage of the electronic device 100 of the user, and a product previously satisfying the predetermined condition but not at present may be present. That is, as illustrated in the upper right drawing of FIG. 7A, the electronic device 100 may reconstruct the second AI model to identify the fourth product 704, or as illustrated in the lower right drawing of FIG. 7A, the electronic device 100 may reconstruct the second AI model not to identify the third product.

For example, the reconstructed second AI model may, when an image including the first through third products 701 to 703 is input as an input data, output the first through third products 701 to 703 as an output data. However, when an image including the fourth product 704 is input to the reconstructed second AI model as an input data, the electronic device 100 may output a product other than the fourth product 704 as an output data, or may output an output data indicating that the image including the fourth product 704 has not been recognized. That is, in a case that a reliability of an output data with respect to a specific image is less than a predetermined reliability, the electronic device 100 may identify that an image including the fourth product 704 is an image with respect to a new product. In this case, the electronic device 100 may transmit an image including the fourth product 704 to the external server 200, and acquire an output data indicating that the image including the fourth product 704 corresponds to the fourth product 704.

For example, as illustrated in FIG. 7B, the electronic device 100 may input an input data to a second artificial intelligence (AI) model to acquire a first output data, at operation S710. The input data may be an image including the fourth product 704, and the first output data may be a product other than the fourth product 704 (or an invalid message). The electronic device 100 may identify whether the first output data is less than or equal to a predetermined reliability value or preset reliability value, at operation S720. That is, the electronic device 100 may identify whether a probability of the first output data corresponding to a product other than the fourth product or whether the first output data outputs an invalid message, and identify whether the first output data is less than or equal to the predetermined reliability value. In a case that the first output data is less than or equal to the predetermined reliability value or preset reliability value, the electronic device 100 may transmit the input data (an image including the fourth product 704) to the external server 200, at operation S730. The external server 200 may input the input data to a first artificial intelligence (AI) model to acquire a second output data, at operation S740. The second output data may be data on the fourth product 704. The external server 200 may transmit the second output data to the electronic device 100, at operation S750. The electronic device 100 may acquire usage information based on the acquired second output data, and acquire reconstruction information based on the acquired usage information, at operation S760. The electronic device 100 may reconstruct the second AI model based on the acquired reconstruction information to acquire a third AI model, at operation S770.

In the sequence diagram of FIG. 7B, in a case that the electronic device 100 does not acquire an accurate output data on the image including the fourth product 704, the electronic device 100 acquires the second output data from the external server 200. However, the example is not limited thereto. For example, in a case that the electronic device 100 does not acquire an accurate output data on the image including the fourth product 704, the electronic device 100 may initialize the reconstructed second AI model and acquire the first AI model, and input the image including the fourth product 704 to the acquired first AI model and acquire a second output data. That is, in a case that the electronic device 100 is an electronic device 100, such as a smartphone, used by a user for a predetermined time or more (for example, a long time such as six hours or more during a day) over a predetermined period of time, and that communication with the external server 200 is easy, the electronic device 100 may acquire the second output data from the external server. In a case that the electronic device 100 is an electronic device 100, such as a refrigerator, used by a user for a predetermined time or less (for example, a short time such as one hour or less during a day) over a predetermined period of time, and that communication with the external server 200 is not easy, the electronic device 100 may acquire the first AI model stored in the memory 110 to initialize the second AI model to the first AI model, and input the input data to the acquired first AI model and acquire the second output data.

In the sequence diagram of FIG. 7B, in a case that the electronic device 100 does not acquire an accurate output data on the image including the fourth product 704, the second AI model is immediately reconstructed to the third AI model. However, the example is not limited thereto. That is, the electronic device 100 may reconstruct the second AI model to the third AI model only when the second output data satisfies the predetermined condition. For example, when an image including the fourth product 704 is input a predetermined number of times for a predetermined time, the electronic device 100 may reconstruct the second AI model to the third AI model. That is, when the image including the fourth product 704 incapable of being recognized through the second AI model is transmitted to the external server and information regarding the fourth product 704 is acquired a predetermined number of times, the electronic device 100 may reconstruct the second AI model to the third AI model.

As illustrated in the lower right drawing of FIG. 7A, in a case that any one or any combination of the first through third products 701 to 703 (for example, the third product 703) does not satisfy the predetermined condition, the electronic device 100 may acquire reconstruction information based on product information excluding the third product, and reconstruct the second AI model based on the acquired reconstruction information to acquire a fourth artificial intelligence (AI) model. For example, in a case that the third product 703 is output a number of times less than a threshold for a predetermined time, the electronic device 100 may acquire reconstruction information based on the first and second products 701 and 702, and reconstruct the second AI model to acquire the fourth AI model.

Figure 10A:
FIG. 10A is a diagram illustrating an example user interface (UI) screen for inputting usage information.

In the embodiment described above, the usage information is acquired based on the output data, but is not limited thereto. That is, the usage information may be directly input by a user setting. For example, as illustrated in FIG. 10A, the electronic device 100 may display a user interface (UI) for adding a new product. When a user command is input through the UI for displaying the new product, the electronic device 100 may acquire usage information including a product corresponding to the input user command and a product corresponding to the output data, and acquire reconstruction information corresponding to the acquired usage information. In FIG. 10A, it is described for convenience of explanation that the electronic device 100 is a smartphone. However, the electronic device 100 may be an electronic device of various types including a display, and further, acquire input of a user command through voice recognition and a remote control device even in the absence of a display.

In FIGS. 7A and 7B, a method for reconstructing an artificial intelligence (AI) model for image analysis in a case in which the electronic device 100 is a refrigerator is described, but is not limited thereto. That is, the technical idea of the disclosure may be applicable to various cases in which image analysis is utilized in the electronic device 100.

Figure 8A:
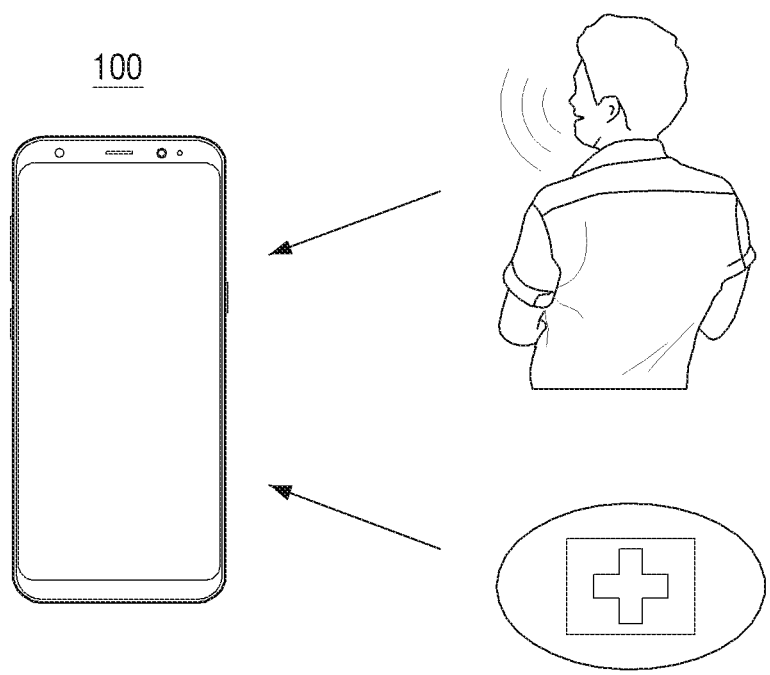
FIG. 8A is a diagram provided to explain an example of a method for reconstructing a language translation artificial intelligence (AI) model, according to another embodiment of the disclosure.
Figure 8B:
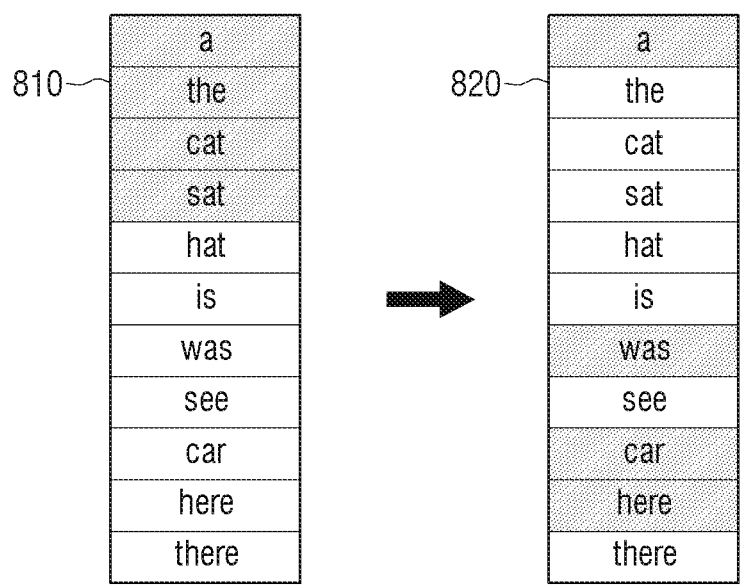
FIG. 8B is a diagram provided to explain an example of a method for reconstructing a language translation artificial intelligence (AI) model, according to another embodiment of the disclosure.

FIG. 8A is a diagram provided to explain an example of a method for reconstructing a language translation artificial intelligence (AI) model, according to another embodiment of the disclosure. FIG. 8B is a diagram provided to explain an example of a method for reconstructing a language translation artificial intelligence (AI) model, according to another embodiment of the disclosure.

The first AI model may be, when a user voice or a text is input as a first language, a language translation model for translating the input voice or the input text to a second language and outputting the input voice or text in the second language. In this case, the first AI model stores a large amount of words to translate various contexts and expression styles. For example, the first AI model may store ten thousand words or more, and process language translation.

However, an individual user using the electronic device 100 often performs language translation only in a particular context, or more often than not, word expressions used are predetermined. Accordingly, the electronic device 100 may acquire reconstruction information based on usage information, and reconstruct the first AI model based on the acquired reconstruction information and acquire the second AI model. In this case, the usage information may include at least one information from among context information, location information, schedule information or expression style of the user. The context information of the user may include information regarding an environment in which the user is to perform translation, age information of the user, occupation information of the user, concern information of the user, etc. The information regarding the environment in which the user is to perform translation may denote, for example, translation information regarding words used in various environments such as translation information related to words used on travel, translation information related to words used in a hospital, translation information related to words used in a restaurant, translation information related to words used in a business conversation and the like. The location information of the user is information regarding a place where the user is located. From the location information of the user, environment information (in a case in which the location information of the user is a pharmacy, a hospital, a restaurant, etc.), a language to be translated or a language expression style (for example, an expression style appropriate for a fancy restaurant and an expression style related to rural accent)

Some of the various usage information described above may be acquired from output data output from an artificial intelligence (AI) model. For example, at least some of the context information, location information, schedule information or expression style of the user may be acquired from a voice or text with respect to the second language that is output from a voice or text with respect to the first language input to the AI model by the user.

However, in some cases, some of the various usage information described above may not be acquired from output data output from an artificial intelligence (AI) model. For example, the context information, location information, schedule information of the user, etc. is more likely to be acquired by a user setting rather than acquired from the output data output from the AI model.

FIG. 10A is a diagram illustrating an example user interface (UI) screen for inputting usage information. FIG. 10B is a diagram illustrating an example user interface (UI) screen for inputting usage information.

For example, as illustrated in FIG. 10A, the electronic device 100 may set usage information according to a user command such as inputting "YES" in response to the question "WANT TO ADD NEW PRODUCT?." FIG. 10B illustrates a user interface (UI) screen capable of inputting usage information or context information of a user. However, the example is not limited thereto, and the schedule information, the location information, etc. may be added to the usage information according to selection of a user. Alternatively, in a case that a predetermined condition is satisfied, some of the usage information incapable of being acquired from the output data output from the AI model may be acquired as the usage information, even if a user command regarding FIG. 10B is not present. For example, when a user command to use the AI model is input, the electronic device 100 may acquire location information of the electronic device 100 according to the input user command, and acquire the acquired location information as the usage information.

Alternatively, the electronic device 100 may acquire usage information on the basis of sensing information acquired through various sensors. For example, the electronic device 100 may acquire the usage information on the basis of location information acquired via a GPS, an image acquired through an image sensor, etc.

The electronic device 100 may acquire reconstruction information on the basis of the various context information described above. The reconstruction information may be information for reconstructing an AI model with a focus on words corresponding to the usage information. For example, in a case that the usage information includes environment information regarding a pharmacy, the reconstruction information may be information including words used in the pharmacy, words related to medicine, etc.

The electronic device 100 may reconstruct the first AI model to the second AI model by using the reconstruction information. In an embodiment, as illustrated in FIG. 8B, the electronic device 100 may reconstruct a first AI model 810 to acquire a second AI model 820, by adding a row corresponding to a word corresponding to the usage information to a word embedding layer included in the first AI model 810, deleting a row corresponding to a word irrelevant to the usage information, changing a position of a row corresponding to a word corresponding to the usage information, and etc. Alternatively, the electronic device 100 may reconstruct the first AI model 810 to acquire the second AI model 820, by changing a weight value of the first AI model 810 using the reconstruction information.

Figure 9A:
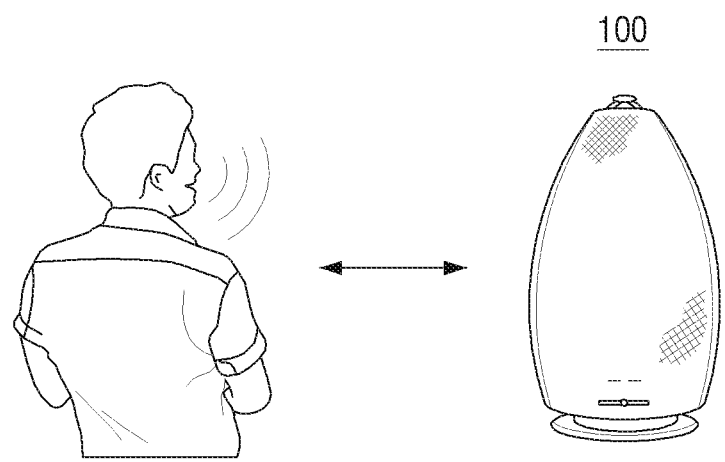
FIG. 9A is a diagram provided to explain various embodiments of the disclosure.
Figure 9B:
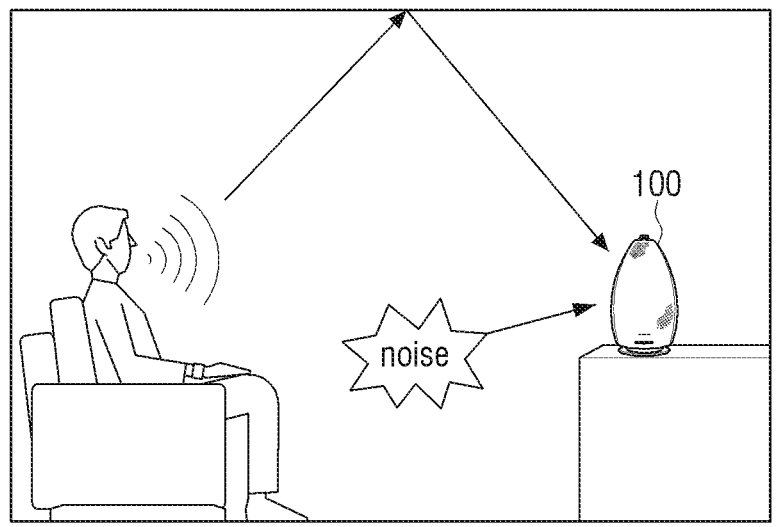
FIG. 9B is a diagram provided to explain various embodiments of the disclosure.
Figure 9C:
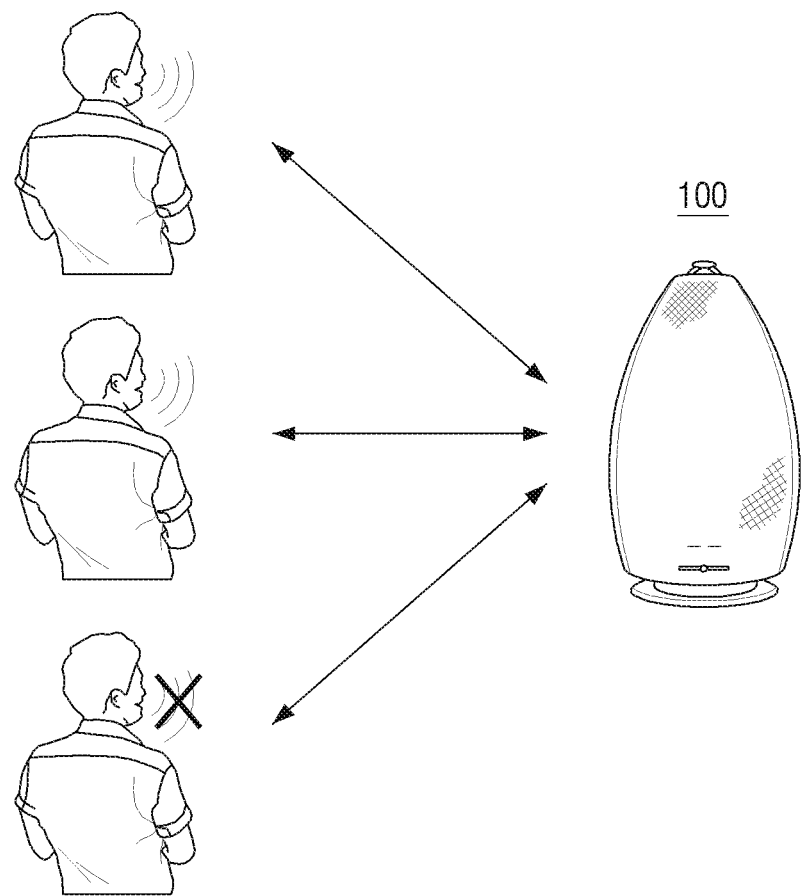
FIG. 9C is a diagram provided to explain various embodiments of the disclosure.

FIG. 9A is a diagram provided to explain various embodiments of the disclosure. FIG. 9B is a diagram provided to explain various embodiments of the disclosure. FIG. 9C is a diagram provided to explain various embodiments of the disclosure.

As illustrated in FIGS. 9A, 9B and 9C, the electronic device 100 may be, for example, an artificial intelligence (AI) speaker. However, the example is not limited thereto, and the electronic device 100 may be of various types that use the corresponding AI model, such as a smartphone, a navigation device and the like.

FIG. 9A is a diagram provided to explain an example method for reconstructing an artificial intelligence (AI) model for updating words frequently used by a user through voice recognition.

The electronic device 100 may input a user voice to a first artificial intelligence (AI) model and output a response to the user voice. The electronic device 100 may acquire data on various words included in the user voice using the first AI model. In a case that the acquired word data satisfies a predetermined condition, the electronic device 100 may acquire usage information based on the word data satisfying the predetermined condition, and reconstruct the first AI model based on the acquired usage information and acquire a second AI model. The predetermined condition may be, for example, data on words acquired a predetermined number of times or more during a predetermined period of time. As described with reference to FIG. 7A, with the accumulation of the user voice data, new word data may be added or deleted, and the electronic device 100 may reconstruct the reconstructed second AI model to a third artificial intelligence (AI) model or a fourth artificial intelligence (AI) model through the various methods described above.

FIG. 9B is a diagram provided to explain an example method for reconstructing an artificial intelligence (AI) model for removing noise.

The electronic device 100 may input a user voice to the first AI model as an input data, and acquire information regarding a place where the user voice is input as an output data. The electronic device 100 may remove noise input to the electronic device 100 on the basis of the acquired location information. In this case, the electronic device 100 may acquire usage information based on the information regarding the place where the electronic device 100 is located that is output through the first AI model. The acquired usage information may be information related to a structure and size of the place and a location of the electronic device 100 within the place. As described above, in a case that it is impossible to acquire the usage information from the output data, the electronic device 100 may acquire new usage information based on a user command or external information. The electronic device 100 may acquire reconstruction information based on the acquired usage information, and reconstruct the first AI model based on the acquired reconstruction information and acquire the second AI model. In a case that a location of the electronic device 100 is changed, the electronic device 100 may reconstruct the AI model according to the new location. In FIG. 9B, a method for removing noise in a user voice is provided. However, the example is not limited thereto, and the technical idea of the disclosure may be applicable to a case in which data sensed by sensors included in the electronic device 100 (for example, a camera, a microphone, etc.) is processed.

FIG. 9C is a diagram provided to explain an example method for reconstructing an artificial intelligence (AI) model for user recognition.

The electronic device 100 may input a user voice with respect to a plurality of users to the first AI model and output user identification information corresponding to the user voice. In a case that the user identification information corresponding to the user voice satisfies a predetermined condition, the electronic device 100 may acquire the user identification information satisfying the predetermined condition as usage information, and reconstruct the first AI model based on the acquired usage information and acquire a second AI model. The predetermined condition may be, for example, user identification information acquired a predetermined number of times or more during a predetermined period of time. That is, the electronic device 100 may recognize users who frequently use the electronic device 100, and reconstruct the AI model to provide a lightened AI model targeting the recognized users. Further, the electronic device 100 may reconstruct an artificial intelligence (AI) model for recognizing user voice on the basis of the user voice corresponding to the user identification information. That is, as described with reference to FIG. 7A, the electronic device 100 may reconstruct the AI model for voice recognition.

Figure 11:
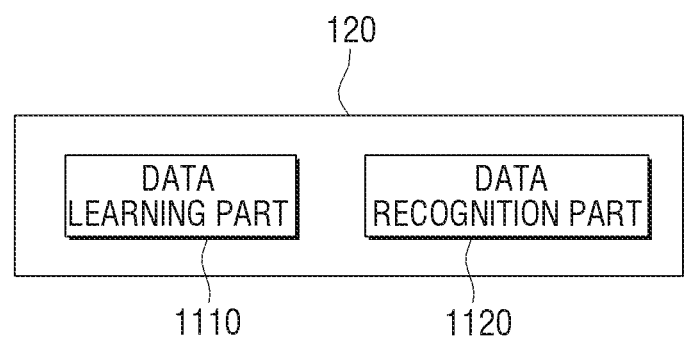
FIG. 11 is a block diagram provided to explain an operation of an electronic device utilizing an artificial intelligence (AI) model, according to an embodiment of the disclosure.

FIG. 11 is a block diagram provided to explain an operation of an electronic device utilizing an artificial intelligence (AI) model, according to an embodiment of the disclosure.

The processor 120 may include a data learning part 1110 and a data recognition part 1120. The data learning part 1110 may train an artificial intelligence (AI) model so that the AI model includes criteria according to a specific purpose. The specific purpose may include a data recognition related to voice recognition, translation, image recognition, context recognition, etc. In addition, the specific purpose may include a purpose related to classification, grouping and clustering of data. The data learning part 1110 may, to identify an operation according to the purpose described above, apply learning data to the AI model and generate the AI model including determination criteria. The data recognition part 1120 may identify a context regarding a specific purpose based on an input data. The data recognition part 1120 may identify a context from a predetermined recognition data, using the trained AI model. The data recognition part 1120 may acquire a predetermined input data according to predetermined criteria, apply the acquired input data to the AI model as an input data, and thereby identify (or estimate) a predetermined context based on the predetermined input data. In addition, a result value output by applying the acquired input data to the AI model as the input value may be used to update the AI model.

At least some of the data learning part 1110 and the data recognition part 1120 may be implemented as a software module or manufactured as at least one hardware chip and mounted on an electronic device. For example, either one or both of the data learning part 1110 and the data recognition part 1120 may be manufactured as a hardware chip for artificial intelligence (AI), or manufactured as a part of an existing general purpose processor (e.g., CPU or application processor) or a graphic exclusive processor (e.g., GPU) and mounted on the various electronic devices described above. In this case, the hardware chip exclusive for AI is an exclusive processor specialized for probability computation, which shows high parallel processing performance as compared with the existing general purpose processor, and thus a computation operation of the artificial intelligence field such as machine learning can be quickly processed. In a case that the data learning part 1110 and the data recognition part 1120 are implemented as a software module (or a program module including an instruction), the software module may be stored in non-transitory computer readable media. The software module may be provided by an operating system (OS) or a predetermined application. Alternatively, a part of the software module may be provided by the OS, and the remaining part may be provided by the predetermined application.

In this case, the data learning part 1110 and the data recognition part 1120 may be mounted on one electronic device 100 or may be respectively mounted on separate electronic devices. For example, the electronic device 100 may include only the data learning part 1110 for training the AI model, and an external device may include only the data recognition part 1120. Alternatively, the electronic device 100 may include both the data learning part 1110 and the data recognition part 1120, and an external electronic device may include the data recognition part 1120 only. The data learning part 1110 and the data recognition part 1120 may provide, via a cable or wirelessly, model information constructed by the data learning part 1110 to the data recognition part 1120, and the data input to the data recognition part 1120 may be provided to the data recognition part 1120 as an additional learning data. As another example, the data learning part 1110 and the data recognition part 1120 may be elements of the external server 200. In this case, when the electronic device 100 transmits learning data or input data to the external server 200, the external server 200 may transmit a result value with respect to the learning data or input data acquired from the electronic device 100 to the electronic device 100.

The data learning part 1110 may further include a data acquisition part, a preprocessing part, a learning data selection part, a model learning part and a model evaluation part. The data acquisition part may be configured to acquire a learning data according to a specific purpose. The preprocessing part is an element for preprocessing a data acquired from the acquisition part to a predefined format. The learning data selection part is an element for selecting a data for learning from among a data acquired by the learning data acquisition part and a data preprocessed by the learning data preprocessing part. A selected learning data may be provided to the model learning part. The model learning part is an element for training an artificial intelligence (AI) model by using a learning data. The model evaluation part is an element for improving a result of an AI model.

Any one or any combination of the data acquisition part, preprocessing part, learning data selection part, model learning part and model evaluation part described above may be implemented as a software module or manufactured as at least one hardware chip and mounted on an electronic device. For example, any one or any combination of the data learning part, the preprocessing part, the learning data selection part, the model learning part and the model evaluation part may be manufactured as a hardware chip for artificial intelligence (AI), or manufactured as a part of an existing general purpose processor (e.g., CPU or application processor) or a graphic exclusive processor (e.g., GPU) and mounted on the various electronic devices described above.

In addition, the data recognition part 1120 may further include a data acquisition part, a preprocessing part, an input data selection part, a recognition result provision part and a model update part. The data acquisition part is an element for acquiring input data. The preprocessing part is an element for preprocessing a data acquired from the acquisition part to a predefined format. The input data selection part is an element for selecting data for recognition from among the preprocessed data. The recognition result provision part is an element capable of acquiring a data selected from among the input data. The model update part is an element for updating an artificial intelligence (AI) model on the basis of an evaluation of a recognition result provided from the recognition result provision part.

Any one or any combination of the data acquisition part, the input data selection part, the recognition result provision part and the model update part described above may be implemented as a software module or manufactured as at least one hardware chip and mounted on an electronic device. For example, any one or any combination of the data learning part, the preprocessing part, the learning data selection part, the model learning part and the model evaluation part may be manufactured as a hardware chip for artificial intelligence (AI), or manufactured as a part of an existing general purpose processor (e.g., CPU or application processor) or a graphic exclusive processor (e.g., GPU) and mounted on the various electronic devices described above.

Figure 12:
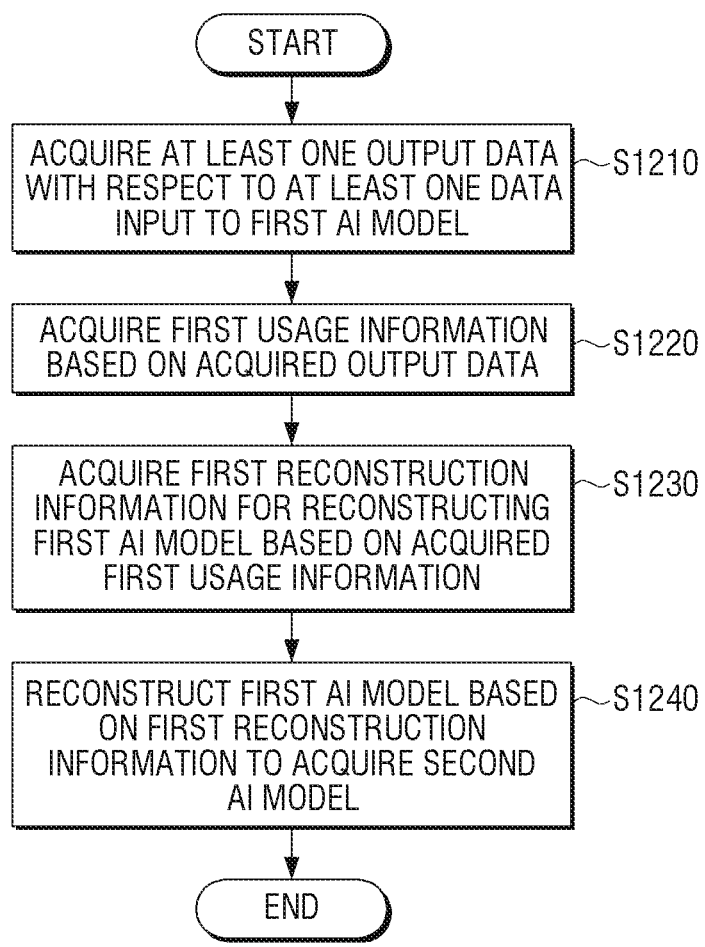
FIG. 12 is a flowchart provided to explain a control method of an electronic device, according to an embodiment of the disclosure.

FIG. 12 is a flowchart provided to explain a control method of an electronic device, according to an embodiment of the disclosure.

The electronic device 100 may acquire at least one output data with respect to at least one input data input to a first artificial intelligence (AI) model, at operation S1210. As described above, the input data and the output data may be different depending on the type of AI model. For example, in a case that the AI model is an image analysis model, the input data may be image data and the output data may be information regarding an object included in the image data. As another example, in a case that the AI model is a language translation model, the input data may be a voice or text in a first language and the output data may be a voice or text in a second language to which the voice or text in the first language is translated. As another example, in a case that the AI model is a voice recognition model, the input data may be a user voice and the output data may be a response to the user voice.

The electronic device 100 may acquire first usage information based on the acquired output data, at operation S1220. As described above, the usage information may include any one or any combination of information regarding usage pattern of a user, information related to a place where the electronic device 100 is located, age information of user of the electronic device, context information and environment information.

The electronic device 100 may acquire first reconstruction information for reconstructing first reconstruction information for reconstructing the first AI model based on the acquired first usage information, at operation S1230. As described above, the reconstruction information may include any one or any combination of information regarding a structure of an AI model, information regarding a weight of the AI model and delta information for reconstructing the first AI model.

The electronic device 100 may reconstruct the first AI model based on the first reconstruction information to acquire a second AI model, at operation S1240. The reconstructed second AI model may be reconstructed to a third artificial intelligence (AI) model or a fourth artificial intelligence (AI) model multiple times according to necessity.

The term "part" or "module" as used herein includes units made up of hardware, software, or firmware, and may be used interchangeably with terms such as logic, logic blocks, components, or circuits. A "part" or "module" may be an integrally constructed component or a minimum unit or part thereof that performs one or more functions. For example, a module may include an application-specific integrated circuit (ASIC).

The various embodiments described above may be implemented as an S/W program including an instruction stored on machine-readable (e.g., computer-readable) storage media. The machine is a device capable of calling a stored instruction from the storage medium and operating according to the called instruction, which may include an electronic device (e.g., the electronic device 100) according to the embodiments described above. When the instruction is executed by a processor, the processor may perform a function corresponding to the instruction directly or by other components under the control of the processor. The one or more instructions may contain a code made by a compiler or a code executable by an interpreter. The machine-readable storage media may be provided as non-transitory storage media. Herein, the term "non-transitory" only denotes that a storage medium does not include a signal but is tangible, and does not distinguish a data semi-permanently stored in a storage medium from a data temporarily stored in a storage medium.

According to an embodiment, the method according to the various embodiments described above may be provided as being included in a computer program product. The computer program product may be traded between a seller and a consumer as a product. The computer program product may be distributed as a machine-readable storage medium (for example, compact disc read only memory (CD-ROM)) or may be distributed online through an online application store (for example, Play Store™). As for the online distribution, at least a part of the computer program product may be at least temporarily stored or acquired on a storage medium such as a server of a manufacturer, a server of an application store or a memory of a relay server.

The respective elements (for example, modules or programs) according to the various embodiments may be configured as a single or multiple entities, and some of the corresponding sub elements described above may be omitted or another sub element may be further included in the various embodiments. Alternatively or additionally, some elements (for example, modules or programs) may be integrated into one entity, and a function performed by the respective elements before integration may be performed in the same or similar manner. The module, a program, or operations executed by other elements according to variety of embodiments may be executed consecutively, in parallel, repeatedly, or heuristically, or at least some operations may be executed according to a different order, may be omitted, or the other operation may be added thereto.

What is claimed is:

1. A control method of an electronic device, the control method comprising:
inputting at least one input data to a first artificial intelligence (AI) model, to acquire at least one output data that is output by the first AI model;
acquiring first usage information, based on the acquired at least one output data;
determining whether the acquired first usage information satisfies a predetermined condition, the predetermined condition comprising first data of the at least one output data being output by the first AI model a number of times that is greater than or equal to a threshold;
in response to determining that the acquired first usage information satisfies the predetermined condition wherein the first data of the at least one output data is output by the first AI model a number of times that is greater than or equal to the threshold:
acquiring first reconstruction information for reconstructing the first AI model, based on the acquired first usage information; and
reconstructing the first AI model, based on the acquired first reconstruction information, to acquire a second AI model, and
in response to determining that the first usage information does not satisfy the predetermined condition wherein the first data of the at least one output data is output by the first AI model a number of times that is less than the threshold:
acquiring second usage information based on the acquired at least one output data excluding the first data of the at least one output data that is output by the first AI model a number of times less than the threshold;
acquiring second reconstruction information for reconstructing the first AI model based on the acquired second usage information; and
reconstructing the first AI model based on the acquired second reconstruction information to acquire a third AI model.

2. The control method as claimed in claim 1, wherein the first usage information comprises any one or any combination of information related to a usage pattern of a user, information of an age of a user of the electronic device, context information and environment information.

3. The control method as claimed in claim 1, wherein the first reconstruction information comprises any one or any combination of information regarding a structure of the second AI model, information regarding a weight of the second AI model, and delta information for reconstructing the first AI model, and
wherein the delta information comprises either one or both of structure information of the first AI model and/or the second AI model, and information regarding a difference of weights between the first AI model and the second AI model.

4. The control method as claimed in claim 1, further comprising:
inputting a first input data to the acquired second AI model, to acquire a second output data;
based on a reliability of the acquired second output data being less than or equal to a predetermined value, transmitting the first input data to a server; and
acquiring, from the server, a third output data with respect to the transmitted first input data.

5. The control method as claimed in claim 4, further comprising:
acquiring third usage information, based on the acquired third output data;
acquiring third reconstruction information for reconstructing the second AI model, based on the acquired third usage information; and
reconstructing the acquired second AI model, based on the acquired third reconstruction information, to acquire a fourth AI model.

6. The control method as claimed in claim 1, further comprising:
displaying a user interface (UI) for modifying the acquired first usage information;
based on a user command for adding to and/or changing the acquired first usage information being input through the displayed UI, modifying the acquired first usage information;
acquiring third reconstruction information for reconstructing the second AI model, based on the modified first usage information; and
reconstructing the acquired second AI model, based on the acquired third reconstruction information, to acquire a fourth AI model.

7. The control method as claimed in claim 1, wherein each of the first AI model and the second AI model is for image analysis or for voice processing and language understanding.

8. An electronic device comprising:
a memory storing instructions; and
a processor configured to execute the stored instructions to:
input at least one input data to a first artificial intelligence (AI) model, to acquire at least one output data that is output by the first AI model;
acquire first usage information, based on the acquired at least one output data;
determine whether the acquired first usage information satisfies a predetermined condition, the predetermined condition comprising first data of the at least one output data being output by the first AI model a number of times that is greater than or equal to a threshold;
in response to determining that the acquired first usage information satisfies the predetermined condition wherein the first data of the at least one output data is output by the first AI model a number of times that is greater than or equal to the threshold:
acquire first reconstruction information for reconstructing the first AI model, based on the acquired first usage information; and
reconstruct the first AI model, based on the acquired first reconstruction information, to acquire a second AI model, and
in response to determining that the first usage information does not satisfy the predetermined condition wherein the first data of the at least one output data is output by the first AI model a number of times that is less than the threshold:
acquire second usage information based on the acquired at least one output data excluding the first data of the at least one output data that is output by the first AI model a number of times less than the threshold;
acquire second reconstruction information for reconstructing the first AI model based on the acquired second usage information; and reconstruct the first AI model based on the acquired second reconstruction information to acquire a third AI model.

9. The electronic device as claimed in claim 8, wherein the first usage information comprises any one or any combination of information related to a usage pattern of a user, information of an age of a user of the electronic device, context information and environment information.

10. The electronic device as claimed in claim 8, wherein the first reconstruction information comprises any one or any combination of information regarding a structure of the second AI model, information regarding a weight of the second AI model, and delta information for reconstructing the first AI model, and
wherein the delta information comprises either one or both of structure information of the first AI model and/or the second AI model, and information regarding a difference of weights between the first AI model and the second AI model.

11. The electronic device as claimed in claim 8, further comprising a communicator comprising a circuitry,
wherein the processor is further configured to execute the stored instructions to:
input a first input data to the acquired second AI model, to acquire a second output data;
based on a reliability of the acquired second output data being less than or equal to a predetermined value, control the communicator to transmit the first input data to a server via the communicator; and
acquire, from the server via the communicator, a third output data with respect to the transmitted first input data.

12. The electronic device as claimed in claim 11, wherein the processor is further configured to execute the stored instructions to:
acquire third usage information, based on the acquired third output data;
acquire third reconstruction information for reconstructing the second AI model, based on the acquired third usage information; and
reconstruct the acquired second AI model, based on the acquired third reconstruction information, to acquire a fourth AI model.

13. The electronic device as claimed in claim 8, further comprising a display,
wherein the processor is further configured to execute the stored instructions to:
control the display to display a user interface (UI) for modifying the acquired first usage information;
based on a user command for adding to and/or changing the acquired first usage information being input through the displayed UI, modify the acquired first usage information;
acquire third reconstruction information for reconstructing the second AI model, based on the modified first usage information; and
reconstruct the acquired second AI model, based on the acquired third reconstruction information, to acquire a fourth AI model.

14. The electronic device as claimed in claim 8, wherein each of the first AI model and the second AI model is for image analysis or for voice processing and language understanding.

15. A control method of a system that comprises an electronic device for reconstructing an artificial intelligence (AI) model, and a server, the control method comprising:

inputting, by the electronic device, at least one input data to a first AI model, to acquire at least one output data that is output by the first AI model;
acquiring, by the electronic device, first usage information, based on the acquired at least one output data;
determining whether the acquired first usage information satisfies a predetermined condition, the predetermined condition comprising first data of the at least one output data being output by the first AI model a number of times that is greater than or equal to a threshold;
in response to determining that the acquired first usage information satisfies the predetermined condition wherein the first data of the at least one output data is output by the first AI model a number of times that is greater than or equal to the threshold:
transmitting, by the electronic device, the acquired first usage information to the server;
acquiring, by the server, first reconstruction information for reconstructing the first AI model, based on the transmitted first usage information;
transmitting, by the server, the acquired first reconstruction information to the electronic device; and
reconstructing, by the electronic device, the first AI model, based on the transmitted first reconstruction information, to acquire a second AI model, and
in response to determining that the first usage information does not satisfy the predetermined condition wherein the first data of the at least one output data is output by the first AI model a number of times that is less than the threshold:
acquiring, by the electronic device, second usage information based on the acquired at least one output data excluding the first data of the at least one output data that is output by the first AI model a number of times less than the threshold;
transmitting, by the electronic device, the acquired second usage information to the server;
acquiring, by the server, second reconstruction information for reconstructing the first AI model based on the acquired second usage information;
transmitting, by the server, the acquired second reconstruction information to the electronic device; and
reconstructing, by the electronic device, the first AI model based on the acquired second reconstruction information to acquire a third AI model.

16. The control method as claimed in claim 15, wherein the first usage information comprises any one or any combination of information related to a usage pattern of a user, information of an age of a user of the electronic device, context information and environment information,
wherein the first reconstruction information comprises any one or any combination of information regarding a structure of the second AI model, information regarding a weight of the second AI model, and delta information for reconstructing the first AI model, and
wherein the delta information comprises either one or both of structure information of the first AI model and/or the second AI model, and information regarding a difference of weights between the first AI model and the second AI model.

17. The control method as claimed in claim 15, further comprising:
displaying, by the electronic device, a user interface (UI) for modifying the acquired first usage information;
transmitting, by the electronic device, the modified first usage information to the server;

acquiring, by the server, third reconstruction information for reconstructing the second AI model, based on the transmitted first usage information; and transmitting, by the server, the acquired third reconstruction information to the electronic device.

18. A system comprising:

an electronic device configured to:
- input at least one input data to a first AI model, to acquire at least one output data that is output by the first AI model; and
- acquire first usage information, based on the acquired at least one output data; and a server configured to:
- receive the acquired first usage information from the electronic device;
- determine whether the acquired first usage information satisfies a predetermined condition, the predetermined condition comprising first data of the at least one output data being output by the first AI model a number of times that is greater than or equal to a threshold;
- in response to determining that the acquired first usage information satisfies the predetermined condition wherein the first data of the at least one output data is output by the first AI model a number of times that is greater than or equal to the threshold:
- acquire first reconstruction information for reconstructing the first AI model, based on the received first usage information;
- reconstruct the first AI model, based on the acquired first reconstruction information, to acquire a second AI model; and
- transmit the acquired second AI model to the electronic device, and in response to determining that the first usage information does not satisfy the predetermined condition wherein the first data of the at least one output data is output by the first AI model a number of times that is less than the threshold:
- acquire second usage information based on the acquired at least one output data excluding the first data of the at least one output data that is output by the first AI model a number of times less than the threshold;
- acquire second reconstruction information for reconstructing the first AI model based on the acquired second usage information;
- reconstruct the first AI model based on the acquired second reconstruction information to acquire a third AI model; and transmit the acquired third AI model to the electronic device.

19. The system of claim 18, wherein each of the first AI model and the second AI model comprises a neural network.

* * * * *